US010728192B2

(12) United States Patent
Cohen et al.

(10) Patent No.: US 10,728,192 B2
(45) Date of Patent: *Jul. 28, 2020

(54) APPARATUS AND METHOD FOR MESSAGE REFERENCE MANAGEMENT

(71) Applicant: Wrinkl, Inc., Sands Point, NY (US)

(72) Inventors: Marc A. Cohen, Blue Bell, PA (US); Erik S. Katz, Sands Point, NY (US)

(73) Assignee: Wrinkl, Inc., Sands Point, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,952

(22) Filed: Dec. 12, 2019

(65) Prior Publication Data
US 2020/0120051 A1 Apr. 16, 2020

Related U.S. Application Data

(63) Continuation of application No. 16/376,427, filed on Apr. 5, 2019, now Pat. No. 10,547,575, which is a continuation-in-part of application No. 16/014,578, filed on Jun. 21, 2018, which is a continuation-in-part of application No. 15/858,696, filed on Dec. 29, 2017, now Pat. No. 10,025,475, which is a continuation-in-part of application No. 15/431,077, filed on Feb. 13, 2017, now Pat. No. 9,860,198.

(60) Provisional application No. 62/446,067, filed on Jan. 13, 2017.

(51) Int. Cl.
H04L 12/58 (2006.01)
H04L 29/06 (2006.01)

(52) U.S. Cl.
CPC ............ *H04L 51/046* (2013.01); *H04L 51/12* (2013.01); *H04L 51/16* (2013.01); *H04L 51/18* (2013.01); *H04L 51/36* (2013.01); *H04L 65/1069* (2013.01); *H04L 65/1093* (2013.01); *H04L 65/4015* (2013.01)

(58) Field of Classification Search
CPC ........ H04L 51/046; H04L 51/12; H04L 51/16
See application file for complete search history.

(56) References Cited

U.S. PATENT DOCUMENTS 8,832,569 B2 9/2014 Chen et al.
9,218,603 B2 * 12/2015 Kumar .................. G06Q 10/10
9,262,455 B2 2/2016 Palay
(Continued)

OTHER PUBLICATIONS blog.standuply.com [online], "Top 50 Features of Slack to Boost Your Productivity," Sep. 2016, [retrieved on Dec. 11, 2019], retrieved from: URL<https://blog.standuply.com/50-additional-features-of-slack-to-boost-your-productivity-959ee56f7893>, 5 pages.
(Continued)

*Primary Examiner* — David E Choi
(74) *Attorney, Agent, or Firm* — Fish & Richardson P.C.

(57) ABSTRACT

A method for referencing a message comprises the steps of receiving selection of an area or object associated with the message on a display, optionally providing an indication that the selection of the area or object has been received, allowing a further message to be formed with a link to the message, wherein the link is associated with the further message responsive to the selection, and causing display of the information associated with the message responsive to selection of a further area or portion.

30 Claims, 24 Drawing Sheets

(56) References Cited

U.S. PATENT DOCUMENTS

| | | | |
|---|---|---|---|
| 9,426,102 B1 | 8/2016 | Wong et al. | |
| 9,860,198 B1 | 1/2018 | Cohen | |
| 9,971,500 B2 | 5/2018 | Yang et al. | |
| 9,996,248 B2 | 6/2018 | Park et al. | |
| 2005/0198584 A1 | 9/2005 | Matthews et al. | |
| 2006/0031361 A1 | 2/2006 | Bailey et al. | |
| 2009/0094288 A1 | 4/2009 | Berry et al. | |
| 2009/0119371 A1* | 5/2009 | Chang | H04L 12/1827 709/206 |
| 2010/0299599 A1 | 11/2010 | Shin et al. | |
| 2011/0289406 A1* | 11/2011 | Wassingbo | G06F 3/0488 715/256 |
| 2012/0198360 A1 | 8/2012 | Wanderski et al. | |
| 2014/0096033 A1 | 4/2014 | Blair | |
| 2014/0143684 A1 | 5/2014 | Oh et al. | |
| 2014/0195621 A1* | 7/2014 | Rao DV | H04L 12/1827 709/206 |
| 2016/0179773 A1* | 6/2016 | Shen | H04M 1/72552 715/753 |
| 2016/0294742 A1* | 10/2016 | Weaver | H04L 67/306 |
| 2018/0159812 A1 | 6/2018 | Sarafa et al. | |

OTHER PUBLICATIONS

Bustle.com [online], "How to Retweet With a Comment, aka Use the Life-Changing Feature Twitter Just Added," Apr. 7, 2015, [retrieved on Dec. 11, 2019], retrieved from: URL<https://www.bustle.com/articles/74648-how-to-retweet-with-a-comment-aka-use-the-life-changing-feature-twitter-just-added>, 4 pages.

Corban Tech [online], "Narwhal: The Best Reddit Client | Apps (App Walkthrough," Dec. 16, 2016, [retrieved on Dec. 11, 2019], retrieved from: URL<https://www.youtube.com/watch?v=78wgtwP1hKE>, 1 page (Video Submission).

engadget.com [online], "WhatsApp can quote messages you want to respond to," Jun. 2016, [retrieved on Dec. 11, 2019], retrieved from: URL<https://www.engadget.com/2016/06/12/whatsapp-quote-messages/>, 3 pages.

HubSpot.com [online], "How to Retweet the Right Way (With a Comment) on Twitter," Apr. 15, 2015, [retrieved on Dec. 11, 2019], retrieved from: URL<https://blog.hubspot.com/blog/tabid/6307/bid/27675/how-to-retweet-the-right-way-in-4-easy-steps.aspx>, 16 pages.

Mashable.com [online], "Twitter Updates TweetDeck, Allows Users to Edit and Retweet," Mar. 22, 2012, [retrieved on Dec. 11, 2019], retrieved from: URL<https://mashable.com/2012/03/22/tweetdeck-rt-updates/>, 3 pages.

outlook.uservoice.com [online], "Outlook for Android: Swipe Options, swipe left for reply, swipe right for forward. please add these options," Sep. 30, 2015, [retrieved on Dec. 11, 2019], retrieved from: URL<https://outlook.uservoice.com/forums/293346-outlook-for-android/suggestions/9992319-swipe-options-swipe-left-for-reply-swipe-right-f>, 5 pages.

Plexus Worldwide [online], "How to Use the New Retweet Function on Twitter | Social Media Solutions," Apr. 7, 2015, [retrieved on Dec. 11, 2019], retrieved from: URL<https://www.youtube.com/watch?v=h9mAP8vwiQ>, 1 page. (Video Submission).

slack.com [online], "Using Slack ," 2019, [retrieved on Dec. 11, 2019], retrieved from: URL<https://slack.com/help/articles/203274767>, 5 pages.

slackhq.com [online], "Sharing messages in Slack ," May 2016, [retrieved on Dec. 11, 2019], retrieved from: URL<https://slackhq.com/sharing-messages-in-slack>, 5 pages.

T5 by Robin Good [online], "Free open-source distributed alternative to Twitter: Mastodon," Oct. 10, 2016 [retrieved on Dec. 11, 2019], retrieved from: URL<tools.robingood.com/site/contents/content/765621/2016-10-06/free-open-source-distributed-alternative-to-twitter-mastodon>, 2 pages (Video Submission).

Tech & Design [online], "How to Retweet anything iPhone iPad iPod Mac," Jul. 18, 2015, [retrieved on Dec. 11, 2019], retrieved from: URL<https://www.youtube.com/watch?v=6D_MkQO0zjY>, 1 page (Video Submission).

express.co.uk [online], "WhatsApp quietly introduced a brand-new way to reply to your messages," Jun. 13, 2016, [retrieved on Dec. 16, 2019] retrieved from: URL<https://www.express.co.uk/life-style/science-technology/679325/WhatsApp-How-To-Quote-Message-In-Reply-iOS-Android-Chat>, 4 page.

PCT International Search Report and Written Opinion in International Appln. No. PCT/US2018/13462, dated Jan. 12, 2018, 7 pages.

slack.com [online], "Share messages in Slack: From channels to search—learn how Slack works from top to bottom!," [retrieved on Dec. 16, 2019] retrieved from: URL<https://slack.com/help/articles/203274767-Share-messages-in-Slack>, 1 page.

\* cited by examiner

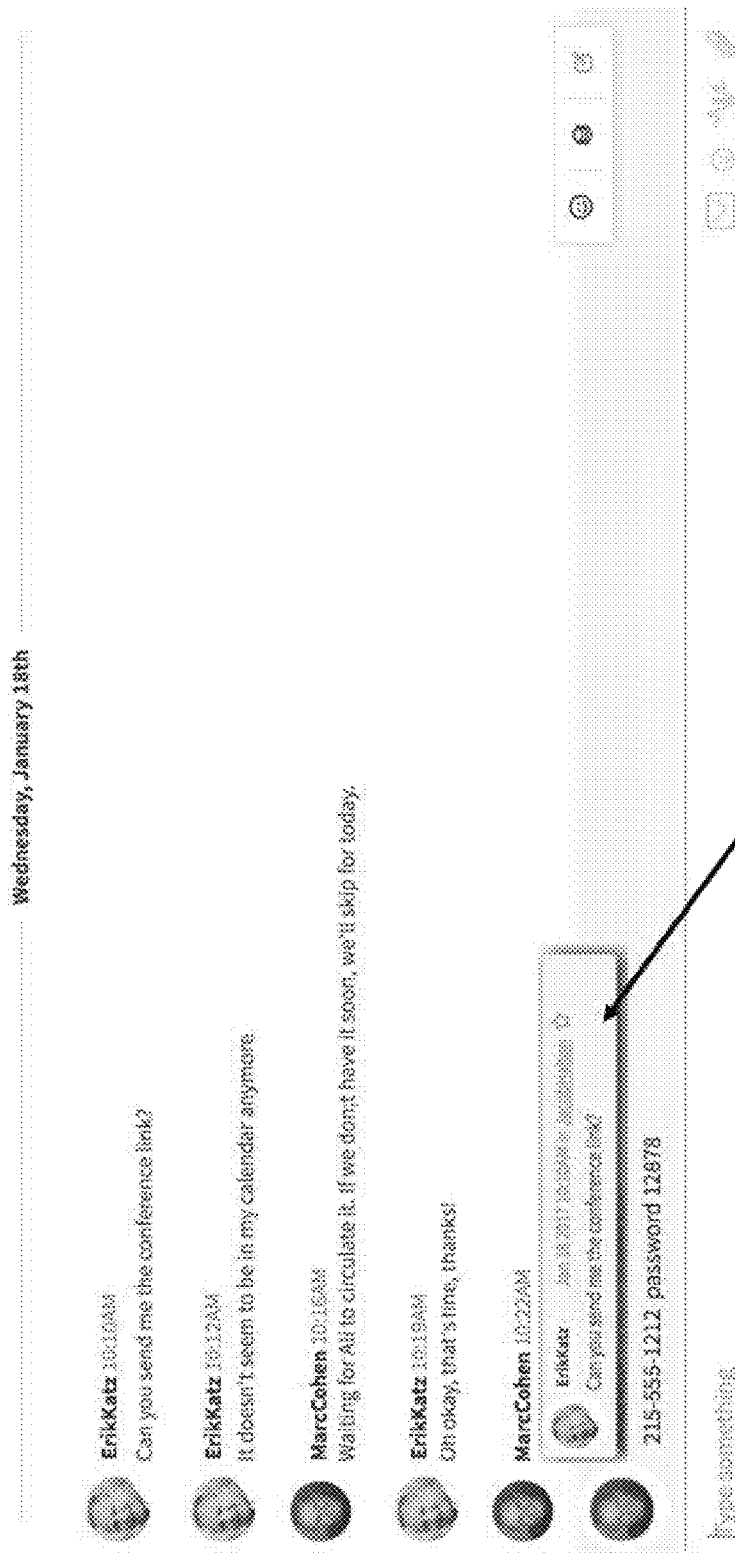

APPARATUS AND METHOD FOR MESSAGE REFERENCE MANAGEMENT

This application is a continuation of U.S. Ser. No. 16/376,427, filed Apr. 5, 2019, which is a continuation-in-part of U.S. Ser. No. 16/014,578, filed Jun. 21, 2018, which is a continuation-in-part of U.S. Ser. No. 15/858,696, filed Dec. 29, 2017, now as U.S. Pat. No. 10,025,475, issued Jul. 7, 2018, which is a continuation-in-part of Ser. No. 15/431,077, filed Feb. 13, 2017, now as U.S. Pat. No. 9,860,198, issued Jan. 2, 2018.

U.S. Ser. No. 15/431,077, filed Feb. 13, 2017 claims the benefit of U.S. Provisional application No. 62/446,067, filed Jan. 13, 2017.

FIELD OF THE INVENTION

The present invention relates to computer messaging and more particularly to management thereof. In particular, an apparatus and method are disclosed for improving computer operational efficiency through message linkage management.

BACKGROUND OF THE INVENTION

Electronic communication, including messaging, provides a very efficient manner of information exchange. In such forms of electronic communication, messages are exchanged between multiple parties in order to convey information. In one known form of messaging, two users operate respective client devices and effectively engage in conversation by transmitting messages between each other. Such communication may be in the form of a single continuous stream of back and forth messaging. Also, in some situations, more than two users (operating, for example, more than two respective client devices) may be communicating in a single continuous stream. While a single stream of messages may be transmitted in an ongoing sequence, it is also possible to have multiple channels, each with their own respective stream of messages.

A "conversation" of messages may be short or it may occur over an extended period of time. Such a period of time can last for hours, days, or even years. During the process of such a conversation, a large quantity of messages may be transmitted between multiple users. Typically, in order to reference an earlier message within a stream of messages, it may be desirable to scroll or somehow visually traverse through messages until an earlier message is located.

BRIEF DESCRIPTION OF THE DRAWINGS

FIGS. 8A-8D are exemplary screen shots that illustrate exemplary operation of an exemplary embodiment of the present invention.

FIGS. 11A-11D are exemplary screen shots that illustrate exemplary operation of an exemplary embodiment of the present invention.

FIGS. 13A-13D are exemplary screen shots that illustrate exemplary operation of an exemplary embodiment of the present invention.

SUMMARY OF THE INVENTION

Figure 1:
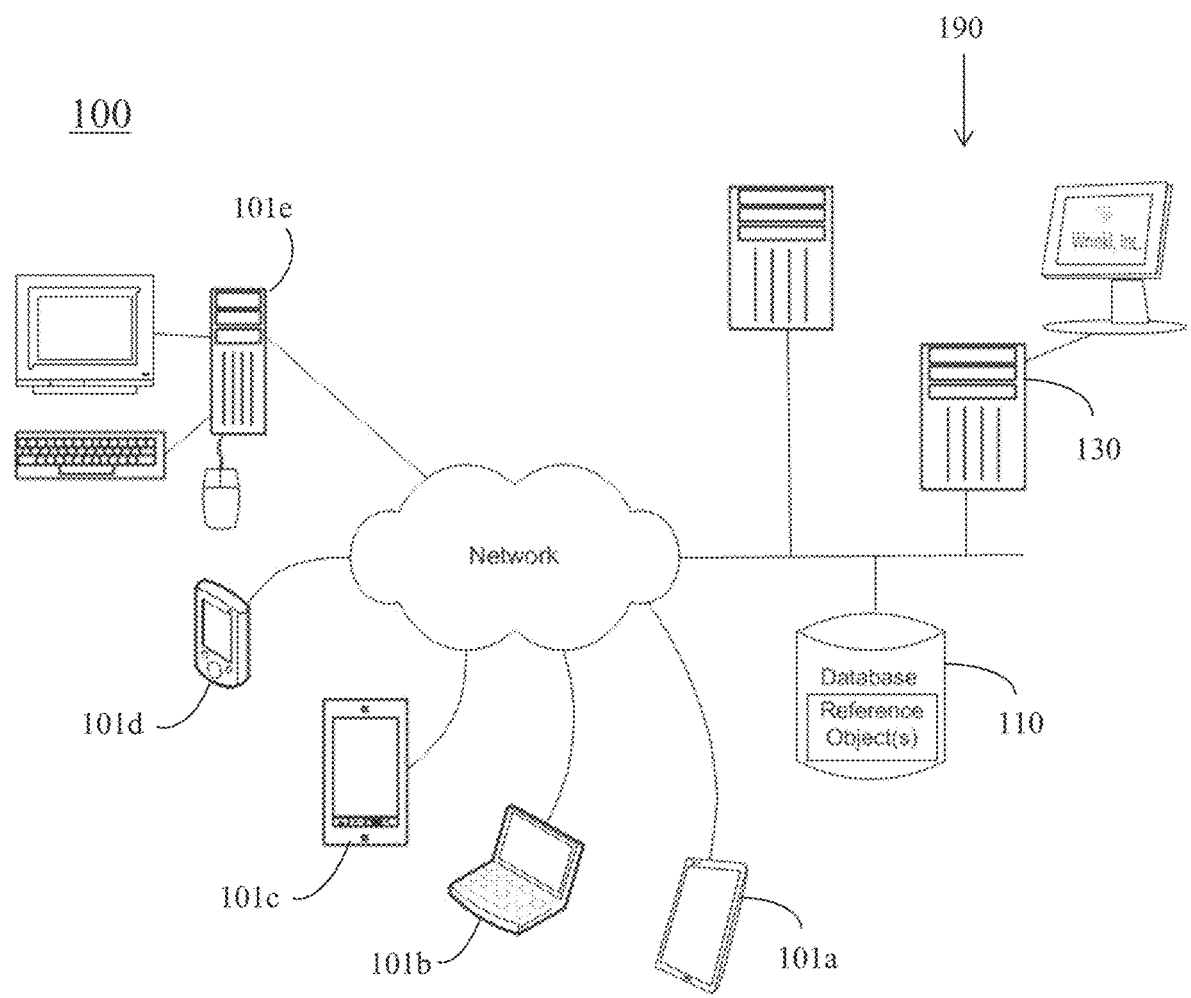
FIG. 1 is a block diagram that illustrates an exemplary network with associated computing devices in accordance with an exemplary embodiment of the present invention.

A method for referencing a message comprises the steps of receiving selection of an area or object associated with the message on a display, optionally providing an indication that the selection of the area or object has been received, allowing a further message to be formed with a link to the message, wherein the link is associated with the further message responsive to the selection, and causing display of the information associated with the message responsive to selection of a further area or portion.

DETAILED DESCRIPTION

The present invention relates to messaging and in particular to the ability of one message to reference another message. With regard to messaging, what is referred to is the ability for one or more users to provide a series of messages. Messages typically occur in a stream, wherein each message comprises data. The data included in messages is often text, but this is merely exemplary as messages can include other content, including possibly any kind of data (e.g. audio, video, animation, graphics, web links, photos, etc.).

In one or more exemplary embodiments of the present invention, a method and apparatus improves the operation of a computer device, by providing links that enable a computer device to operate with greater efficiency. In particular, in several exemplary embodiments, when one message references another message, and time has elapsed between the two messages, the invention enables a computer device to operate with advantages over the prior art. For example, in the prior art, to enable one message to reference an earlier message, a search for the earlier message can be inefficient, time consuming, can delay message response while an earlier message is located, and can request that data stored in memory be duplicated. By contrast, in accordance with exemplary embodiments of the present invention, the use of visual display of an earlier message (or portions thereof) and selection (in various manners to be described below), enables message referencing in a manner that enables faster computer processing and more efficient use of computer devices for exemplary forms of communication such as messaging.

Messaging (such as chat messaging) has become a very popular form of electronic communication due to its affordability and ease of use. On any given day, users may exchange numerous messages regarding a diverse range of topics. The users may use the messages to discuss, for example, group activities, to solicit opinions about various topics, or simply exchange short conversations with friends or co-workers. One of the drawbacks to using typical chat messaging systems is the sequential nature of the messages sent and received. For example, messages often appear in a channel or log in chronological order. If a user in a group chat session comes back from a meeting after several hours, they may be confronted with a bunch of messages. In this regard, the group chat sessions are often characterized by short bursts of dialog around a given topic. By the time a user views the messages, the topic may have changed several times. This makes it difficult for a user to post a response to a previous message that is within context of the ongoing message conversation.

Methods and systems for providing references (such as context-based references) to link messages (such as chat messages) are disclosed herein. This allows a user to generate and insert a (reference) object into a (chat) message stream that links or otherwise references a chat message (such as a prior message or later message) the user intended to send. It is contemplated that the techniques disclosed herein may be particularly beneficial in certain types of communication platforms. However, so as to illustrate the method and system functionality, and not by way of limitation, the communication platform described herein is an exemplary chat messaging platform. It is envisioned that one skilled in the art could make and use the methods and systems described herein with other types of communication platforms. Some of these communication platforms may include, for example, text messaging, short message services (SMS), e-mails and other types of similar on-line communication platforms for facilitating electronic information exchanges between client devices of a plurality of users. The use of chat messaging described herein is merely exemplary, as other forms of messaging may also be used in accordance with exemplary embodiments of the present invention.

With respect to chat messaging platforms, a message (for example in a chat message session) that a user wishes to respond to or reference occurred as a standalone comment or as part of a previous and unrelated (to a most recent discussion chain) discussion. A chat message session, as used herein, refers to a series of messages that are exchanged between one or more users, wherein for more than one user the users are in a group of users. When one of the users in the group adds a new message to a chat message session, the new message is sent to other users in the group. For example, if a first user adds a new message to the chat message session between three users in a group, then the new message may be sent to other selected users of the group, such as the second user and/or the third user. Thus, the chat message session may simulate a real-life conversation because users may communicate to the group at large, or to a specific person or a subset of the people in the group.

In some situations, a user may want add a new message that is related to a previous message in the chat message session. When replying to the previous message at the current point in time in the session, the reply message may appear out of context and could be confusing to other users in the session. This is because the chat message sessions often include numerous messages that may have been entered over a short period of time. Some group messaging users employ various strategies to minimize the effect of their writing messages when trying to refer to or reply to a previous message in the session. In one example, a user may copy and paste the prior message into the text message entry bar and then add additional text. In another example, the user may include addition information in the new message to make it clear what is being responded to. In yet another example, the user may specify the message being referenced by identifying and referencing something unique about the message such as who sent it, the date and/or the time it was sent. One problem with using these types of techniques is that extra text entry space may not be available in a chat message system that limits the amount of data that can be entered into a given message. Moreover, the user may miss some important information if they cut and paste only a portion of the previous message or the identifying information regarding the previous message may not be complete or accurate.

To put it another way, a first message ("message") may be one of several messages. A second message ("further message") may also be one of the several messages. It may be desirable for the second message to reference the first message. By "reference" what is meant is that there is a connection between the second message and the first message. The connection may be for example a link. With such a link, while the second message is being viewed, some aspect of the first message may also be viewed. The aspect of the first message may be, for example, all of the first message, part of the first message, a modified form of all or part of the first message, and/or data associated with the first message. Exemplary associated data may include a user (or some form of identification of the user) associated with the first message, a date and/or time associated with the first message, Gucci and/or some other data associated with the first message.

In one exemplary embodiment of the present invention, a "reference object" is inserted into a text entry box that is being used to form a second message so that (after the second message is transmitted) a "display object" can be displayed (with the second message) that references the first message. In one embodiment of the present invention the reference and display object are the same while in another embodiment of the present invention the reference and display object are different. The reference object, or the display object, or both, references the first message as more clearly described below.

Chat messages (as an example of messages) are thus beneficially enhanced to provide users with additional information related to the meaning of their electronic conversations without introducing expensive overhead or burdensome retrieval mechanisms. For example, a user may make a selection associated with a first message which then automatically inserts a reference object into a text entry bar of a chat message system. The reference object may provide a link to automatically identify and access data from the first message. The user may then add additional text in the text message box before or after the reference object. When the message is sent, a display object associated with the first message is included in the newly posted second message. If multiple messages are referenced then one or more of the display objects are displayed in the newly posted message. It is also possible for the same message to be referenced multiple times by different new messages at any time in the chat message session. In addition, computer processing efficiency is improved through the use of links and without simply duplicating previously inputted data. Efficiency is also improved by enabling access to at least a portion of previously available data without a need to manually locate the previously available data.

Each display object can then be activated in the chat session in several ways. For example, by hovering over and/or selecting the display object, text data (or other data or portions thereof) associated with the referenced first message may be displayed (e.g., above, to the side of, below) with respect to the newly posted message. The information thus provides the reader with immediate and useful context relating to the message they are reading by allowing them to see the message that is referenced. In some implementations, other visual or audio mechanisms can be added to highlight the display object. For example, the display object may displayed in a different text color, font size, or a change to a portion or all of the background of the referred message or include various type of animation effects.

While the above description is with regard to first and second messages, it is understood that "first" and "second" (or "message" and "further message") are merely being used to identify two messages that have been separately entered into a computer system (and then, for example, sent). In one embodiment of the present invention, the first message is sent before the second message, although this merely exemplary (i.e. the order may be reversed).

In one implementation, a computer program product may be installed and/or a service may be selected from a cloud-computing environment in order to obtain the benefits of the techniques described herein. In an implementation, the computer program product may be downloaded onto a client device. For example, a user may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser. In one exemplary embodiment, software to achieve the above results is stored in a cloud computing environment. In another exemplary embodiment, the software is stored in local client devices. In a further exemplary embodiment of the present invention, the software is stored in a combination of a cloud computing environment and (one or more) local client device(s).

FIG. 1 is a block diagram that illustrates an exemplary network with associated computing devices in accordance with an exemplary embodiment of the present invention. In an exemplary embodiment of the present invention, two or more computing devices (e.g., client devices) may engage in an electronic communication session (e.g., chat session) with each other. In some implementations, a first participant/client device may engage in a chat session with a second participant/client device via a network. As shown, communications network 100 includes a plurality of computing devices such as client devices 101a-101e which may include for example, a base station, a personal data assistant (PDA), a laptop/netbook and a tablet as well as computing server devices and (e.g., computing devices that can be located at a number of different receiving stations). The various devices may be interconnected via a network or direct connection and/or may be coupled via a communications network (e.g., a LAN, WAN, the Internet, etc. that may be wired or wireless). In some implementations, the computing devices may communicate with each other before accessing the communication network. In some implementations, the network may include a database running on or in communication with the server device and/or the client devices or some combination thereof. In some implementations, the database may store reference objects and/or display objects related to one or more chat messages. Server 190 is also illustrated. Server 190 includes computing device 120, computing device 130, a terminal for data input and/or display, etc. Communication may occur via network 140. While client devices such a devices 101a and 101b are shown, it is understood that fewer or more client devices such as client devices 101x and 101z (not shown) may also be included). Memory for storing data that is useful in accordance with an exemplary embodiment of the present invention may be included in the form database 110.

The above description is with regard to at least two users (or more) communicating with each other with respective client devices. In a further exemplary embodiment of the present invention, the "first message" and the "second message" are both entered into the same computing device. In a further exemplary embodiment of the present invention, further messages may or may not be included from a source outside of the computing device from which the "first message" and "second message" are entered. In yet another exemplary embodiment of the invention, a single user may enter the "first message" on one computing device and the "second message" on another computing device.

Figure 2:
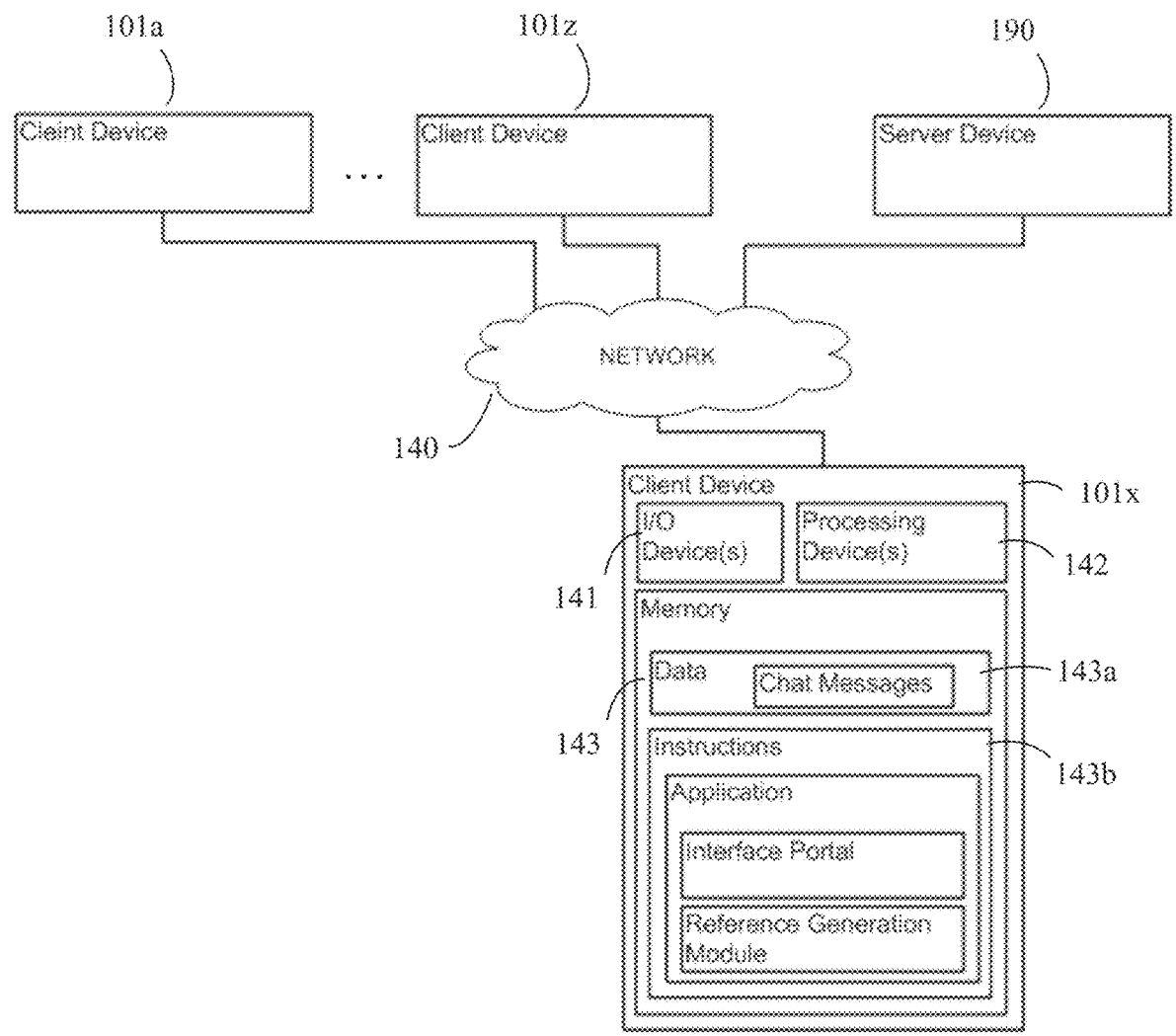
FIG. 2 is a block diagram that illustrates details of an exemplary client device in accordance with an exemplary embodiment of the present invention.

FIG. 2 is a block diagram that illustrates details of an exemplary client device in accordance with an exemplary embodiment of the present invention. In one or more exemplary embodiments of the present invention, the system may facilitate the transfer of electronic communications between computing devices of two or more users or participants over a communication network. The system can include one or more servers (e.g. a server device), which provide access or a communication link between a plurality of client devices in order to facilitate communication between two or more client devices over a network. In some implementations, the system may include an interface portal that provides for the display of network content, such as chat messages of a chat message session or any other type of network data received in response to a transmitted chat message.

FIG. 2 illustrates a plurality of client devices 101a-101z. In an exemplary embodiment of the present invention, features of the invention may be included on a server 190 (shown in FIG. 1) or on a client device 101a-101z. Exemplary client device 101x is illustrated. Client device 101x may include I/O device driver(s) 141 (and/or related database structures), processing device(s) 142 (and/or related database structures) and memory 143. Memory 143 may include data memory 143a and instruction memory 143b. One or more drivers may include a message engine and/or a link engine as more fully described below. To facilitate integrating context-based references into a chat session, the system may include a reference generation module by itself or part of the engines described below. The reference generation module may generate and transmit the references (or links) in a chat session that can be perceived by users of the client devices of the system (i.e. visual objects). The functionality of the reference generation module can exist in a fewer or greater number of modules than what is shown, with such modules residing at one or more computing devices, which may be geographically dispersed.

Figure 3:
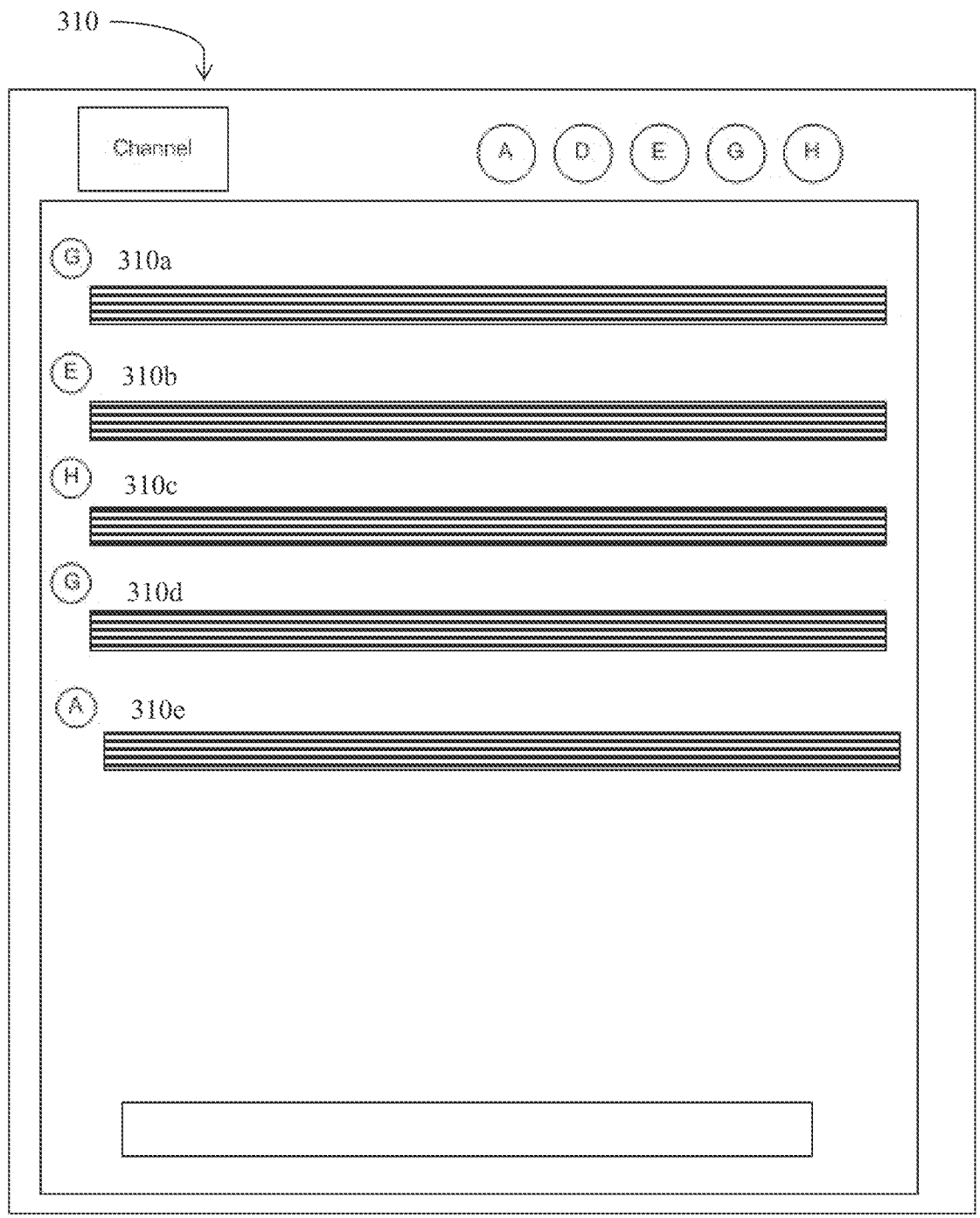
FIG. 3 illustrates an exemplary interface portal of a client device in accordance with an exemplary embodiment of the present invention.

FIG. 3 illustrates an exemplary interface portal 310 of a client device 101x in accordance with an exemplary embodiment of the present invention. The interface portal provides an example interface in which a chat messaging session can be engaged by a number of users that are represented by the participant icons 310a-310e on the portal. In some implementations, the interface portal may include several panels that include a channel/dialog panel that displays the different chat session groups that a particular user has joined. The interface portal displays a plurality of chat messages exchanged by the users. In some implementations, the interface portal includes a message window panel that may include a count of the current participants and a text entry region that allows the participants to insert and reformat the text (i.e., bold, italics, color), add a link (hypertext link) or other type of data into a chat session. Each message that is entered into the text entry region is displayed in the message window panel. In some implementations, the messages can be augmented with one or more references to a previous message in the chat session.

Figure 4:
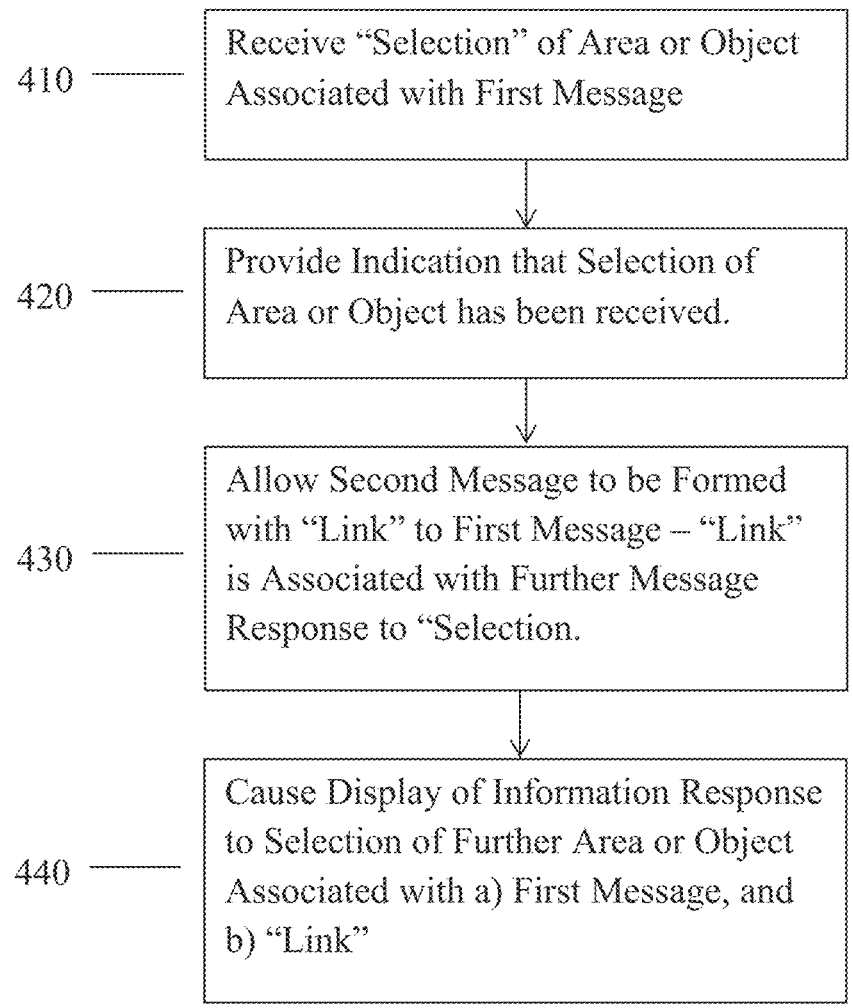
FIG. 4 is a flowchart diagram that illustrates exemplary message referencing in accordance with an exemplary embodiment of the present invention.

FIG. 4 is a flowchart diagram that illustrates exemplary message referencing in accordance with an exemplary embodiment of the present invention. At step 410, "selection" of an area or object associated with a $1^{st}$ message is received. The selection may be accomplished through different mechanisms. Selection can be accomplished with a click, a hovering, with the cursor, the finger, etc. For example, the selection may entail moving a cursor or some other indicator over to a $1^{st}$ message or an area associated with a $1^{st}$ message so that an object or area associated with the $1^{st}$ message can then be selected. In one exemplary embodiment, the object being selected is a display object, an area with defined limits. The area may have an exemplary shape, size, color, pattern, identification, etc. Alternatively, the text of the $1^{st}$ message or portion thereof may be selected. One exemplary method of selection is moving a cursor and then subsequent selection using an I/O device such as a mouse that is controlling the cursor. In another exemplary embodiment, a touch sensitive screen may be used. Selection may then be accomplished by touching the touch sensitive screen in some manner including the use of a finger, stylus, etc. A cursor, finger, or stylus are examples of a "further object" and where the "further object" is placed is a step in the process of obtaining selection by placing the further object over where the area associated with the message or the object is displayed.

Optionally, with (or thereafter) the selection of the area or object associated with the $1^{st}$ message, other action(s) may also be taken. The additional action(s) may be, for example, sending communication (i.e. a message or other data) to a location that is predefined or defined by data associated with the $1^{st}$ message. The action may occur with the selection, at optional step 420 (below), or at other times.

At optional step 420, an indication is provided that the selection of step 410 has been received. The indication may be in many exemplary forms including a visual indication. The visual indication may include for example the display of a dot on a screen. Alternatively, for example, the indication of receipt of the selection may include the insertion of a reference object in a text input box. This will be further described below.

While step 420 is included in some exemplary embodiments, it may be omitted (or temporarily omitted) in other exemplary embodiments. Thus, for example, in one exemplary embodiment, no visible indication is provided that the selection of step 410 has occurred (or has been received).

At step 430, a $2^{nd}$ message is allowed to be formed with a link to the $1^{st}$ message. The link may be a reference object, a display object, or a reference object which is the same as the display object. The link is associated with the $2^{nd}$ message and references the $1^{st}$ message. Furthermore, the link is created responsive to the receipt of the selection of step 410. This link is further described below.

In a further exemplary embodiment of the present invention, a text entry box is provided. Although the text entry box is optional, the text entry box may appear on a screen as a place where the second message is formed before transmitted. Selection of the area of object (i.e. display object) associated with first message may result in the visual indication described with reference to step 420, or may result in another indication. For example, the indication may be (or additionally may be) insertion (and/or display) of the reference object into the text entry box.

At step 440, display of information is caused responsive to selection of a further area or object associated with a) the $1^{st}$ message and b) the link. Thus, for example, the $2^{nd}$ message may be displayed with a display object (i.e. the area associated with the second message and associated with the link to the first message) after the second message is transmitted. Selection of the display object will cause information to be displayed. The information may be some or all of the $1^{st}$ message, or some type of identifying information or user information associated with the $1^{st}$ message, for example.

Figure 5:
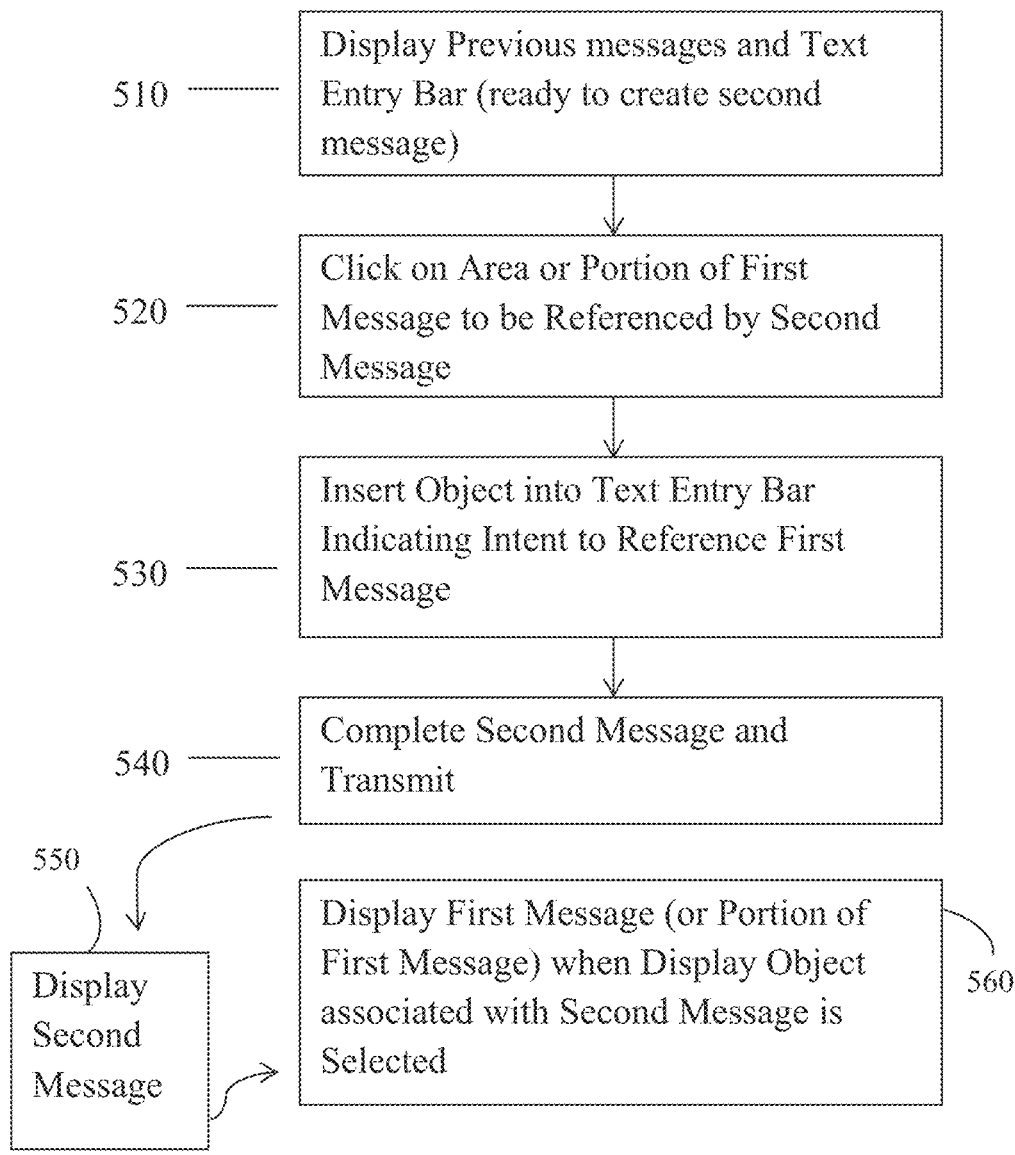
FIG. 5 is a flowchart diagram that illustrates exemplary message referencing in accordance with a further exemplary embodiment of the present invention.

FIG. 5 is a flowchart diagram that illustrates exemplary message referencing in accordance with a further exemplary embodiment of the present invention. At step 510, previous messages are displayed. In addition, a visual structure to facilitate text entry may be included. The visual structure may be a text entry bar. As characters are typed using an I/O device, for example, the characters may appear in the text entry bar. After the typing of the message has been completed, in one exemplary embodiment of the present invention, the text entry bar may be optionally hidden, the text may be sent, and the text that was inputted into the text entry bar may be repositioned so that it appears with other messages that have been sent and received. In any event, by displaying the text entry bar, for example, a visual indication is provided to the user that the client device that will transmit the completed message is ready for the completed message to be created.

Next, at step 520, a user clicks on an area or portion of a $1^{st}$ message to be referenced by a $2^{nd}$ message. The area may include a display object as more fully described below. A "click" may refer to some sort of selection. The area being clicked may include text that is included in the $1^{st}$ message itself, and area occupied by the $1^{st}$ message as it appears on a screen, a display object with a defined border, a display object where the border is not clearly defined, etc. The process of clicking or selection will cause the $2^{nd}$ message to be able to reference the $1^{st}$ message.

At step 530, a reference object is inserted into a text entry bar. By inserting the object into the text entry bar, intent to reference the $1^{st}$ message is indicated. This step is optional.

In one exemplary embodiment of the present invention, the "selection" described in step 520 causes automatic insertion of the reference object into the text entry bar in step 530. In other words, in response to a selection (such as clicking on a display object in the first message), the reference object that includes the link to the first message appears in the text entry bar. This "one click" process of having the reference object be displayed (or be inserted) into the text message bar enables advantageous computer processor performance. By contrast, one could manually insert a link to the first message in the second message, but creation and insertion of such a link is time consuming and subject to errors. The inventors have determined that such a link could be created by selecting (i.e. highlighting) data (i.e.

a link to the first message) associated with the first message, copying the selection (performed for example with a mouse right click), moving a cursor to the text entry bar, selecting a location in the text entry bar, and pasting the selection (of the link) into the text entry bar. This procedure assumes that a link (that references the first message) is visually displayed in some manner so that the above procedure can be performed. One advantage of exemplary embodiments of the present invention is that the process has been automated, so that selection of a display object (as it appears or may be selected on the display) causes the reference object to appear in the text entry bar, preferably with no other steps performed by the user (or with fewer steps performed by the user than with the select/copy/select/paste procedure outlined above).

At step 540, the $2^{nd}$ message is completed. Subsequently, an instruction is provided to transmit the $2^{nd}$ message.

At step 550, the $2^{nd}$ message is displayed. The $2^{nd}$ message may be displayed in various places including, for example, a client device from which the message was transmitted, a client device to which the message is transmitted, a device where a message is displayed without being transmitted outside of the device, etc.

At step 560, after the $2^{nd}$ message is displayed (with the display object), selection of the display object causes display of the $1^{st}$ message, a portion of the $1^{st}$ message, data associated with the $1^{st}$ message, etc.

Generation of a reference object, and subsequent generation of a display object, may be accomplished in accordance with a further exemplary embodiment of the present invention. For example, a unique identifier may be assigned to each message. There are numerous ways to generate unique identifiers, including sequential numbering, numbering based on a system clock, numbering based on a chronological clock, etc. Generation of a reference object may be initiated by an event that occurs and is detected by software (that is causing or related to the display of the messages on the client device). Put another way, for each display object on a plurality of messages that are displayed, an event "listener" is waiting for an interaction with the display objects. When a particular display object is selected (i.e. clicked, hovered, etc.), the selection of the display object is routed to software that will create a reference object, and ultimately a display object. Furthermore, selection of the display object causes the unique identifier of the message associated with the display object to be stored in a database. That unique identifier will then be associated with the reference object as the reference object is created. When the reference object is indeed created, a visual icon (for example) that represents the reference object may be inserted in a place to indicate that that the display object has been selected. The visual icon that represents the reference object is thus inserted, for example, into the text entry bar. Furthermore, the reference object is linked to the identifier that has been stored for the message associated with the display object that has been selected. After the message (i.e. the "second message" described above) has been transmitted, the display object is created and, again, the display object may be associated with the identifier that has been stored in the database for the message associated with the earlier display object that has been selected.

The above description has been with regard to a display object. It is understood that the display object may be represented by a visual icon with defined borders, or it may be represented by some other visual method, such as text associated with a message or space (i.e. space that appears on a display) that overlaps or is adjacent to a message.

Figure 6:
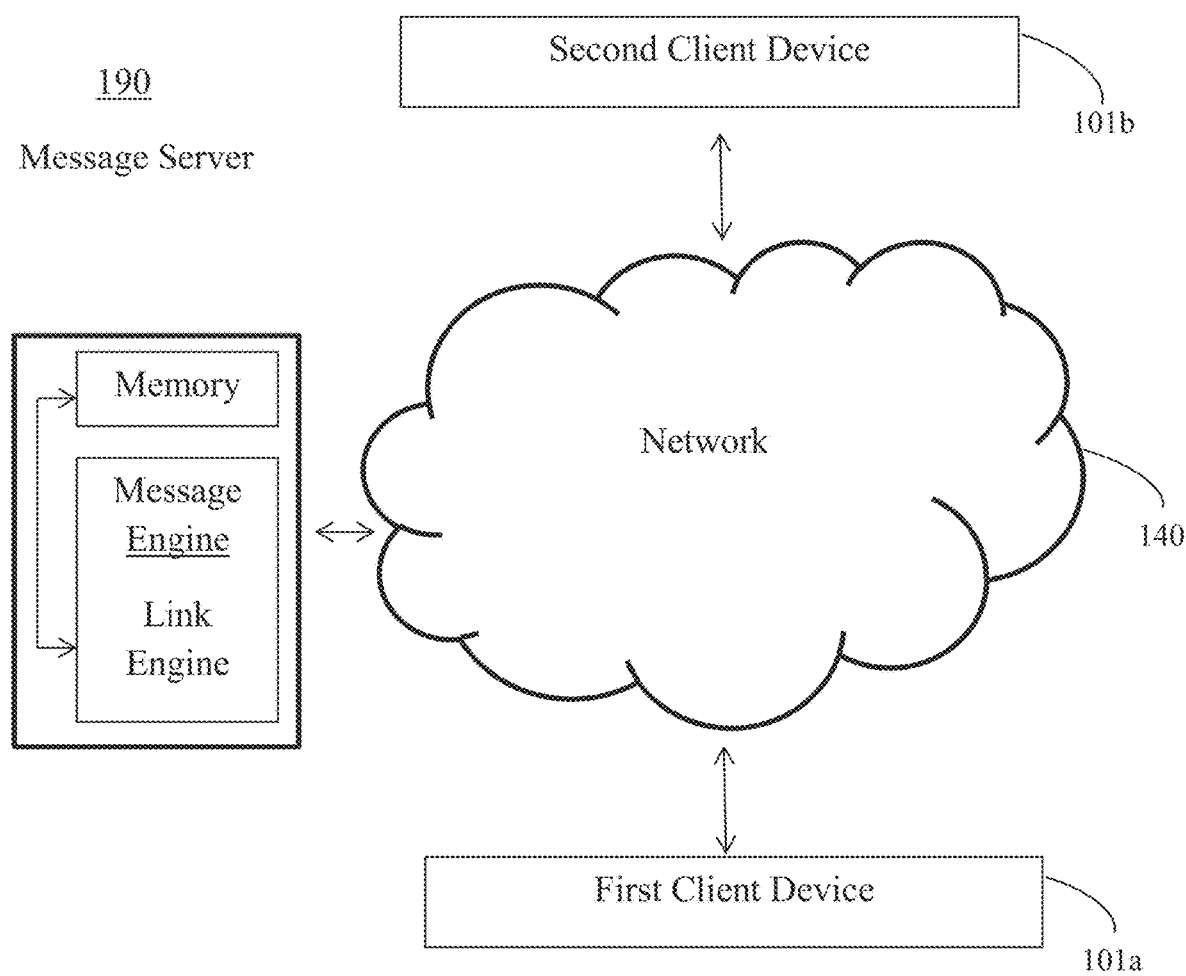
FIG. 6 is a block diagram that illustrates an exemplary network with associated computing devices in accordance with a further exemplary embodiment of the present invention.

FIG. 6 is a block diagram that illustrates an exemplary network with associated computing devices in accordance with a further exemplary embodiment of the present invention. FIG. 6 illustrates that $1^{st}$ client device 101A and $2^{nd}$ client device 101B are coupled to network 140. Network 140 may be, for example, the Internet. Message server 190 is also shown coupled to network 140. In the exemplary embodiment shown in FIG. 6, message server 190 includes a message engine and a link engine. A memory is also included. The message engine is for a) receiving selection of an area or object associated with a message on a display; and b) providing an indication that selection of area or object associated with the message has been received. The link engine is for a) allowing a further message to be formed with a link to the message, wherein the link is associated with the further message responsive to the selection; and b) causing display of information associated with the message responsive to selection of a further area or portion associated with i) the further message; and ii) the link.

Figure 7:
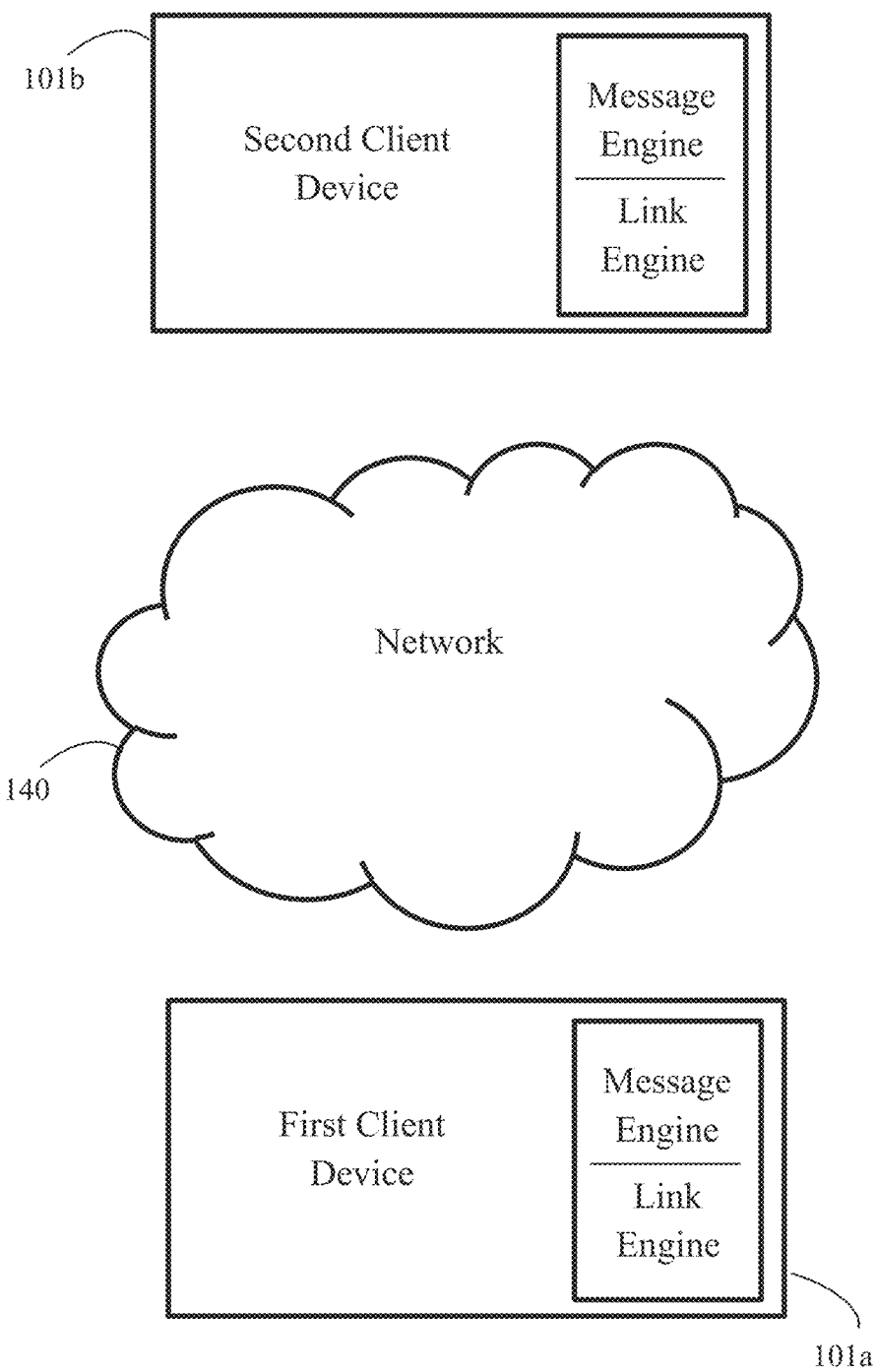
FIG. 7 is a block diagram that illustrates an exemplary network with associated computing devices in accordance with yet another exemplary embodiment of the present invention.

FIG. 7 is a block diagram that illustrates an exemplary network with associated computing devices in accordance with yet another exemplary embodiment of the present invention. FIG. 7 differs from FIG. 6 in that, in FIG. 6, the message engine and link engine are included in message server 190. By contrast, in FIG. 7, $1^{st}$ client device 101a and $2^{nd}$ client device 101b each includes a respective message engine and link engine.

FIGS. 8 through 11 are exemplary screen shots that illustrate exemplary operation of an exemplary embodiment of the present invention.

Figure 8A:
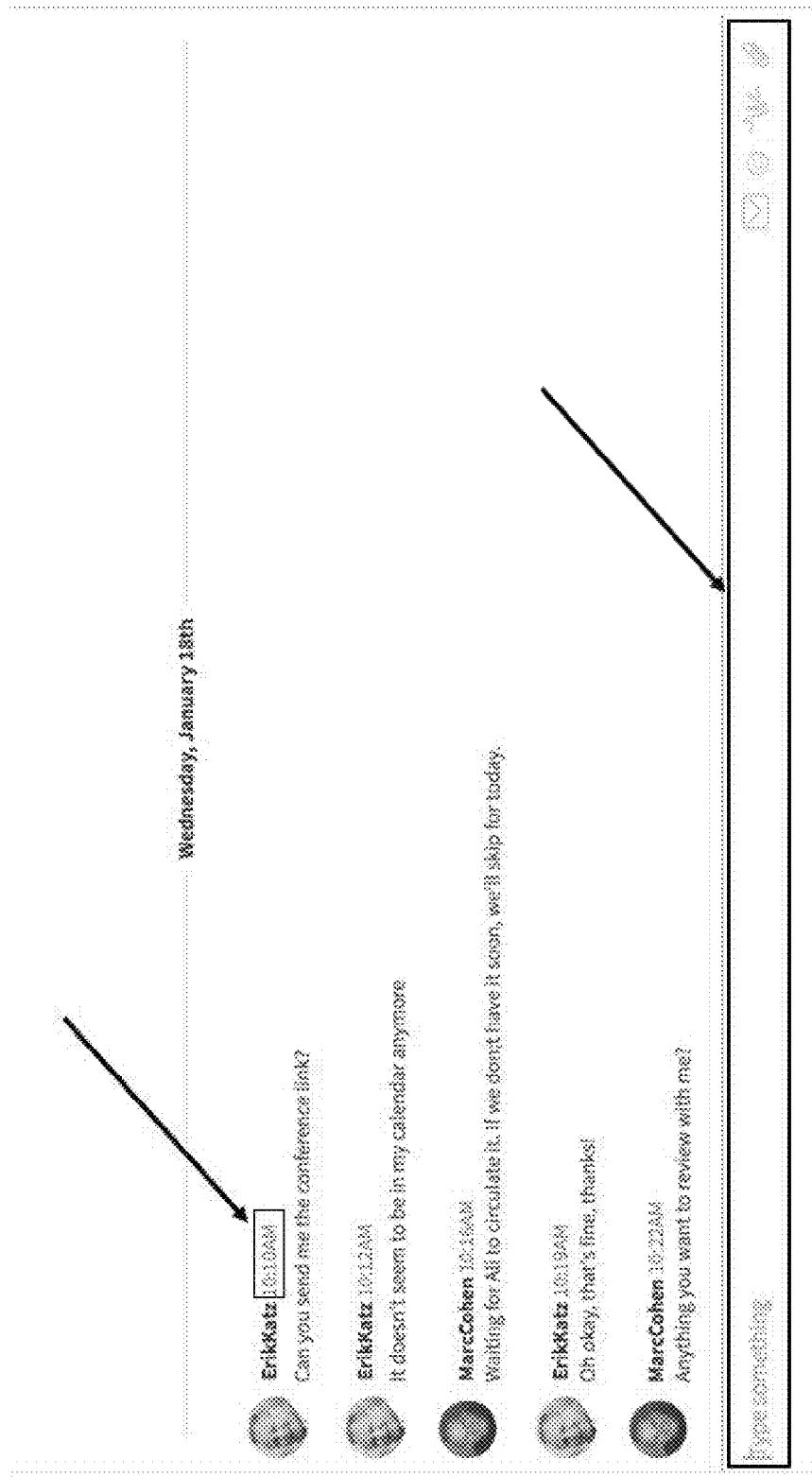

FIG. 8A-8D illustrates operation of an exemplary embodiment of the present invention. As shown in FIG. 8A, a plurality of messages have already been sent so that, in effect, a conversation (or chat) is occurring between 2 users. In the messages shown in FIG. 8A, two users ErikKatz (hereafter "EK") and MarcCohen (hereafter "MC") are having a chat. MC has sent a message to EK: "Anything you want to review with me?" MC now wants to send EK another message in which MC responds to EK's message "Can you send me the conference link?" (hereafter, "first message"). It is noted in the example, however, that four messages have been sent between the first message and when MC is ready to send the second message (in response to the first message). The question then becomes, how does MC answer the first message without confusion because four messages have been sent in the interim? One solution identified by the inventors would be to copy the first message and transmit an answer to the first message along with a copy of the first message. There are difficulties with this approach. For example, copying a previous message and inserting the previous message can entail multiple steps including highlighting, selecting, copying, selecting and pasting. Also, when the copy of the first message is transmitted as part of the second message, the recipient of the second message may be required to see more information than is desired. In accordance with an exemplary embodiment of the present invention, a text message box is displayed to the person who is sending the response to the first message—the response being the "second message". For purposes of this explanation, the person sending the first message (and receiving the second message) will be referred to as the $1^{st}$ user and the person sending the $2^{nd}$ message (and receiving the $1^{st}$ message) will be referred to as the $2^{nd}$ user. In FIG. 8A, the text message box is displayed to the $2^{nd}$ user so that the $2^{nd}$ user can enter the message (i.e. the second message) that will be transmitted to the $1^{st}$ user. As part of the $2^{nd}$ user constructing that $2^{nd}$ message, the $2^{nd}$ user wishes to reference the 1$^{st}$ message. The 1$^{st}$ message is shown with a display object, namely 10:10 AM. The 2$^{nd}$ user will select the display object. Selection of the display object is accomplished by various techniques including positioning a cursor over the display object and clicking, placing a finger over the display object on a touch screen, etc. These forms of selection are merely exemplary because selection can also include selecting another area associated with the 1$^{st}$ message, and object associated with the 1$^{st}$ message, text associated with the 1$^{st}$ message, etc. It is also noted that selection is accomplished by viewing whatever is to be selected on a display and by physical movement (or virtual movement) of what is being used to perform the selection. FIG. 8 also illustrates that once the display object is selected, part of the selection process may include changing how the display object is displayed.

While FIG. 8A illustrates a user clicking on the time, this is merely exemplary as other areas of the object (or associated with the object) may be selected for initiating creation of the reference object during the process of creating the second message.

Figure 8B:
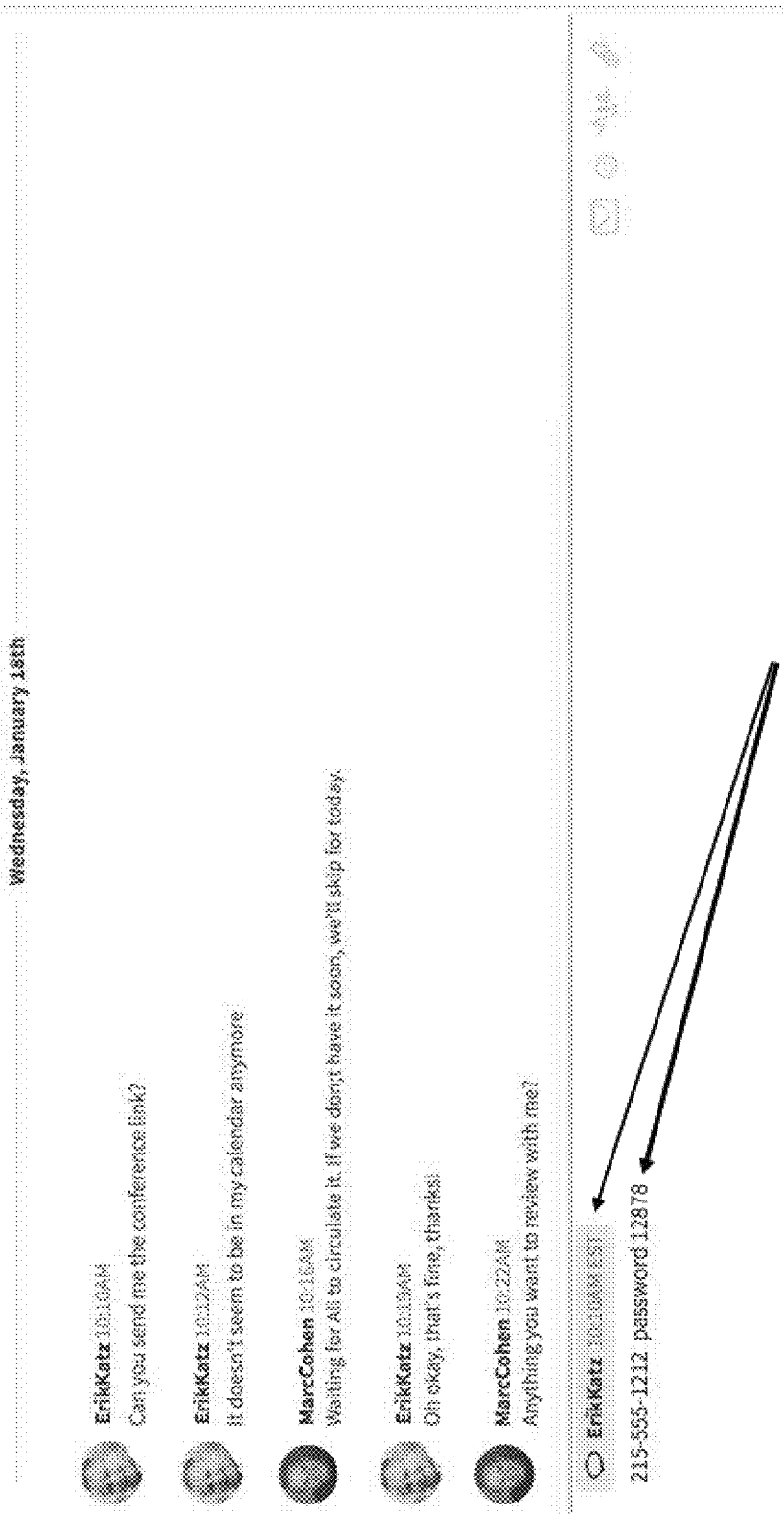

FIG. 8B illustrates what occurs after the display object associated with the 1$^{st}$ message has been selected. Thus, for example, FIG. 8B illustrates that a reference object has been inserted into the text entry box. The reference object shown of example in FIG. 8B is "ErikKatz 10:10 AM EST". The manner in which the reference object (i.e. name and time) is merely exemplary. The reference object shown in FIG. 8B includes a link to the 1$^{st}$ message. Thus, after the 2$^{nd}$ message is transmitted, the 1$^{st}$ user will receive the 2$^{nd}$ message and the 2$^{nd}$ message will include a display object. Selecting the display object in the 2$^{nd}$ message by the 1$^{st}$ user will cause the 1$^{st}$ message, or some aspect of the 1$^{st}$ message to be displayed.

It is noted in this explanation that a reference object is inserted into a message when a message is created and a display object is displayed after the 2$^{nd}$ message (or any message) is received and displayed to the 1$^{st}$ user (or any user). Both the reference object and the display object reference the 1$^{st}$ message. For example, the reference object and the display object may both be a link to the 1$^{st}$ message. In one embodiment, the reference object and the display object both include the same link to the 1$^{st}$ message. In another exemplary embodiment, the reference object may include a 1$^{st}$ link to the 1$^{st}$ message, wherein the 1$^{st}$ link is replaced in the display object with a 2$^{nd}$ link to the 1$^{st}$ message. Alternately, or in addition, the reference object and the display object both link to the 1$^{st}$ message but differ in how they appear on a display. This is further described below.

FIG. 8B also illustrates that once the reference object has been inserted into the text message box, the 2$^{nd}$ user can continue to add text into the text message box. FIG. 8B illustrates additional text added into the text message box after the reference object has been inserted into the text message box. It is understood, however, that in some exemplary embodiments text can be added into the text message box before the reference object is added into the text message box.

Figure 8C:
Figure 8C:
Figure 8C:
Figure 8C:
Figure 8C:
Figure 8C:
Figure 8C:
Figure 8C:

After user 2 has completed entering text into the text message box and causing the reference object to be added into the text message box, the 2$^{nd}$ user is then able to transmit the 2$^{nd}$ message. After transmitting the 2$^{nd}$ message, the 2$^{nd}$ message will then appear as part of the chat. This is shown in FIG. 8C. In FIG. 8C, the 2$^{nd}$ message appears as part of the chat and the reference object has been replaced with a display object. In FIG. 8C, the visual appearance of the display object is somewhat different than the visual appearance of the reference object that appeared in FIG. 8B. This variation in visual appearance between the reference object and the display object is merely exemplary.

FIG. 8C illustrates how the 1$^{st}$ user is able to view the chat (although the view being seen by the 2$^{nd}$ user might be similar or identical). The 1$^{st}$ user is then able to view the 1$^{st}$ message, or a portion thereof, or data associated therewith, by selecting the display object. Selection, again, can include touching of a touchscreen above where the display object is displayed, virtual selection with a cursor, etc.

By selecting the display object, the 1$^{st}$ message (or portion thereof, or data associated therewith) may appear on the screen. This is illustrated in FIG. 8D. The 1$^{st}$ message, or portion thereof, appearing on the screen may appear by the 1$^{st}$ user selecting the display object, the 2$^{nd}$ user selecting the display object, or both.

The above examples have included illustrations and descriptions of illustrative reference objects and display objects. It is understood, however, that the displays associated with reference objects and display objects are not limited to the examples provided above.

Assume, for example, that a reference object has the visual appearance "Sona G. 10:15 am" in the text entry box. In this regard, the label portion "Sona G." represents identifying information of the user that entered the previous chat message and the label "10:15 am" identifies the time the message with entered into the chat messaging system. In some implementations, other identifying information, such as the date in which the chat message was sent, can be included in the reference object display label. It should be noted that the above described visual appearance is merely an illustrative example. The identifying information for the reference object may include various other types of information, for example, plain text, images, audio/video mediums and other types of identifying information. The identifying information can also be inferred, derived or looked-up info. For example, the link could provide information over and above that which was included in the actual message—i.e., address and phone number—or even an advertisement or coupon based on the content or some known attributes of the 1$^{st}$ message. Ex. "First 10 people who Reference this message get 25% discount coupon good for admission" the Ref Pop can be an ad—this is a desirable way to have an ad embedded by known users into messages other users will see.

The reference object, in one or more exemplary embodiments, can be inserted anywhere in the text entry box. For example, the reference object can be inserted to the left or right of the text entry box cursor either initially or at any time after the user has initiated their message. In this regard, the location of the insertion of the reference object is controlled by the location of the text box cursor. The reference object can also be in another form, such as a highlighted background color that serves to indicate that the second message is linked to the first message (i.e. clicking anywhere the background color appears) would reveal the popup message. In some exemplary embodiments, the user may include additional text that can be entered into the text entry box either before or after the placement of the reference object.

In one or more exemplary embodiments, multiple previous messages can be referenced and included in the message stream. If multiple messages are referenced then one or more of the reference objects are displayed. For example, the user may select a display object associated with the date/time filed of a second chat message. The interaction of the user with the display object may activate the reference generation module of the chat messaging system for the second chat message. A second reference object noting certain identifying information of the chat message may be inserted in the text entry box of the interface portal. The second reference object, in one or more exemplary embodiments, can be inserted anywhere in the text entry box. As noted above, the user may include additional text that can be entered into the text entry box either before or after the placement of the second reference object. It is possible for the same message to be referenced multiple times by different new messages at any time in the future (or in the past).

Figure 9:
FIG. 9 is an exemplary screen shot that illustrates exemplary operation of an exemplary embodiment of the present invention.

FIG. 9 illustrates an exemplary embodiment in which two previous messages are being referenced. As shown, two display objects have been selected. Therefore, two different reference objects have been inserted into the text entry box. The resulting message, once sent will include two different display objects.

Figure 10A:
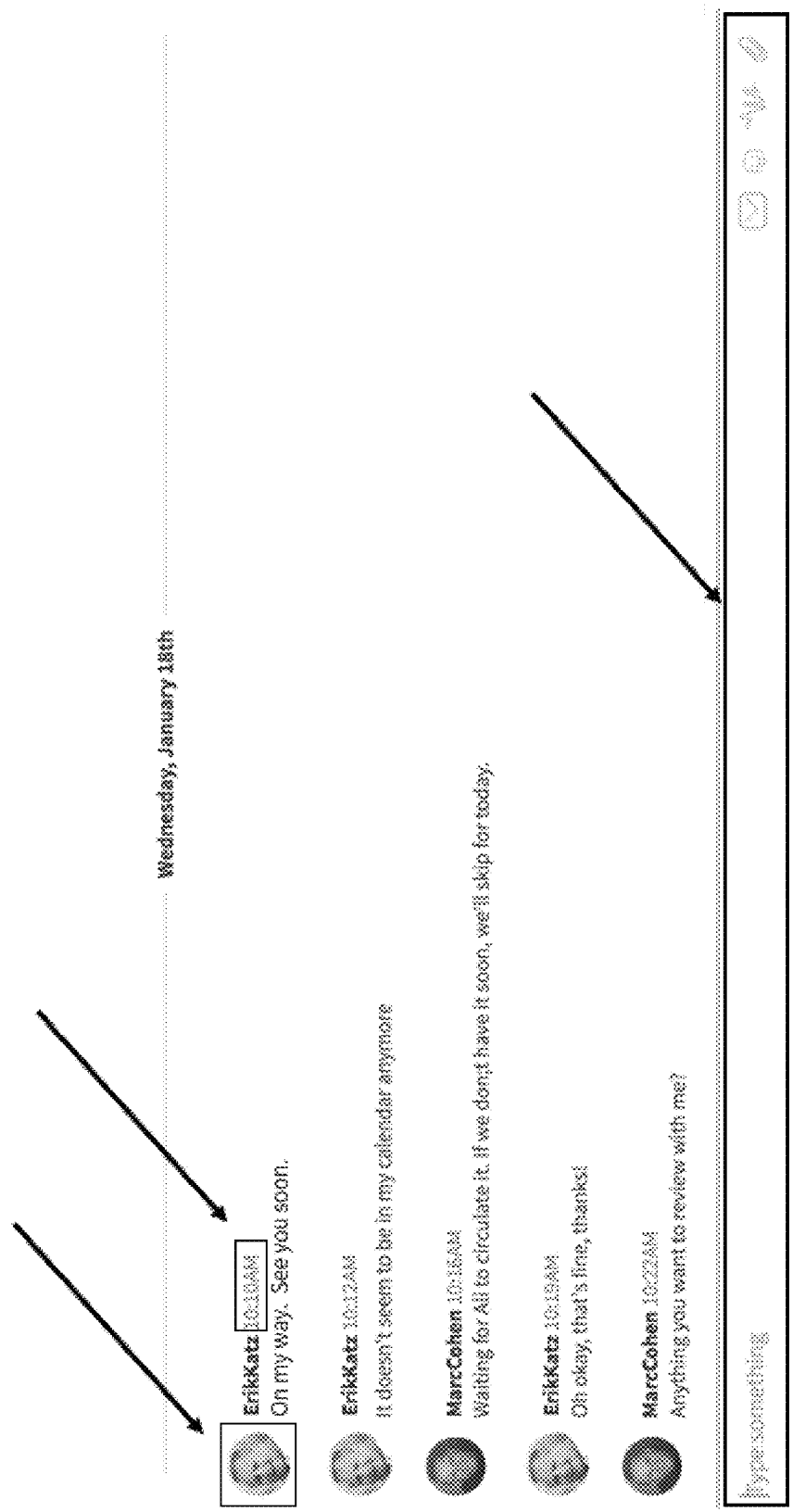
FIGS. 10A-10C are exemplary screen shots that illustrate exemplary operation of an exemplary embodiment of the present invention.
Figure 10B:
Figure 10C:
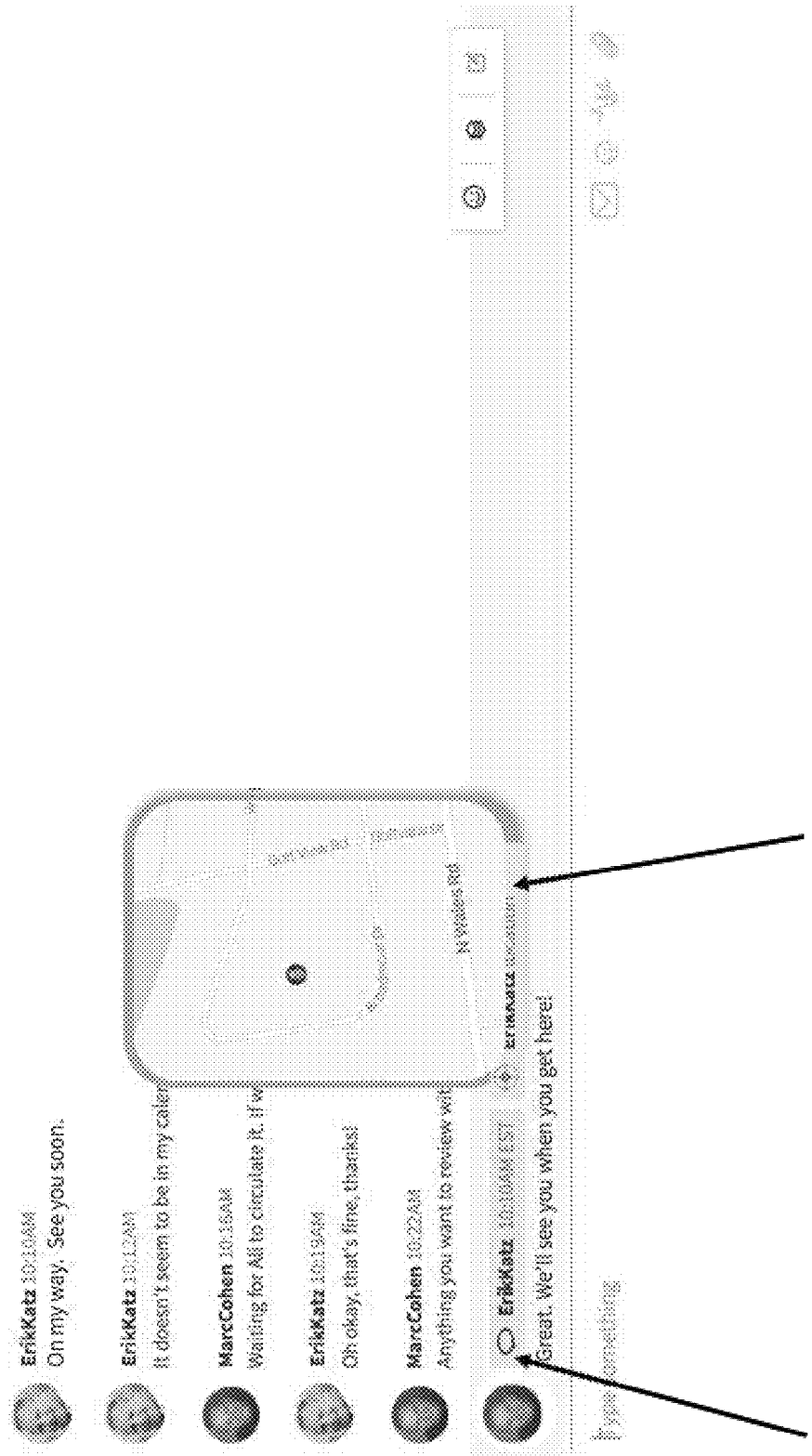

FIGS. 10A-10C illustrate a further exemplary embodiment of the present invention. As illustrated in FIG. 10A, a message may include two different display objects, and a different action occurs depending upon which display object is selected. To put it another way, a different action may occur depending upon which part of a message is selected for creation of a reference object. In the example shown, in FIG. 10A, selection of the display object 10:10 AM results in the display of the message associated with the display object 10:10 AM. Furthermore, selection of the display object that is represented as the person's face results in the display of location (e.g. GPS information) of that person. The display of contact information is merely exemplary as any other type of data may also be displayed (e.g. contact information, a hyperlink, etc.). In the illustrated exemplary embodiment, display of location information (e.g. GPS information) is the result of set up information that is pre-stored prior to selection of the display object. In FIG. 10B, as a result of the selection of the two display objects in FIG. 10A, two corresponding reference objects are inserted into the text entry box. FIG. 10C illustrates that after the message that has been entered in FIG. 10B is transmitted, the message then appears with two corresponding display objects. Furthermore, FIG. 10C illustrates that by hovering over (i.e. selecting) the right-most display object, a map showing the location of ErikKatz appears. This map is merely exemplary.

Figure 11A:
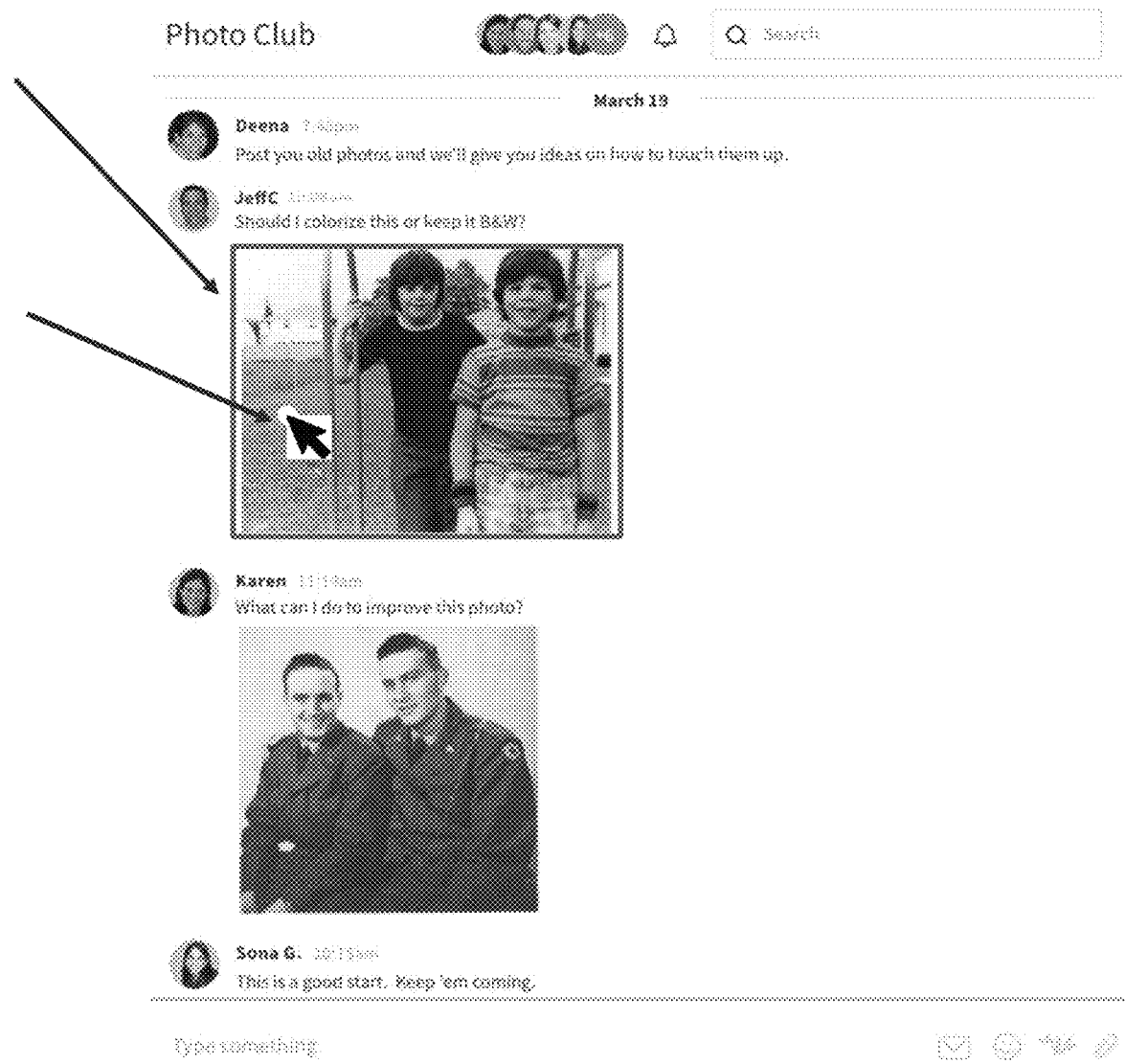
Figure 11B:
Figure 11C:

FIGS. 11A-11D illustrate a further exemplary embodiment of the present invention. These figures illustrate how it is possible to reference something other than a text message. In this case a photo is being referenced. Furthermore, the referenced photo optionally indicates an area of interest that has been indicated by a user. As illustrated in FIG. 11A, a stream of exemplary messages include photographs. Furthermore, in this example, Deena wishes to give advice regarding JeffC's photograph. Deena selects JeffC's photograph so that a reference object (and subsequent display object) can be created that references JeffC's photograph. But, Denna has also selected a portion of JeffC's photograph (shown in the figure by a white circle). FIG. 11B illustrates that a reference object has been inserted into the text entry box that references JeffC's photo with the white dot selected portion. In FIG. 11C, Deena has sent the message, which now appears with a display object that corresponds to the reference object that was inserted into the text entry box in FIG. 11B. In FIG. 11D, when the display object is selected, the photo (with the indicated portion—indicated by an "x") appears (in this embodiment as a pop up).

Figure 12:
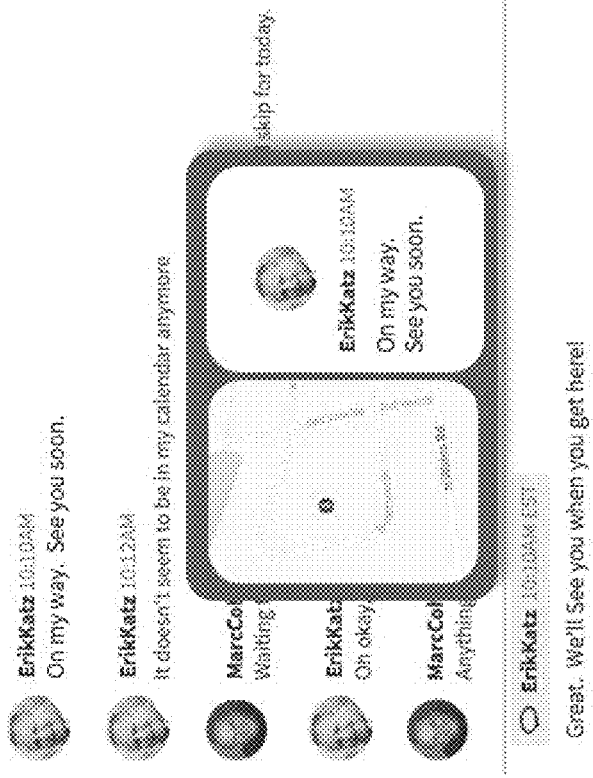
FIG. 12 is an exemplary screen shot that illustrates exemplary operation of an exemplary embodiment of the present invention.

FIG. 12 illustrates an exemplary embodiment of the present invention in which, when a display object is selected, an image based on additional data appears based on predefined rules. In FIG. 12, for example, the predefined rule is that when a display object for ErikKatz is selected, an image showing the location of ErikKatz (based for example on GPS data) also appears. While the image shown in FIG. 12 is a map with location data, this image is merely exemplary.

Figure 13A:
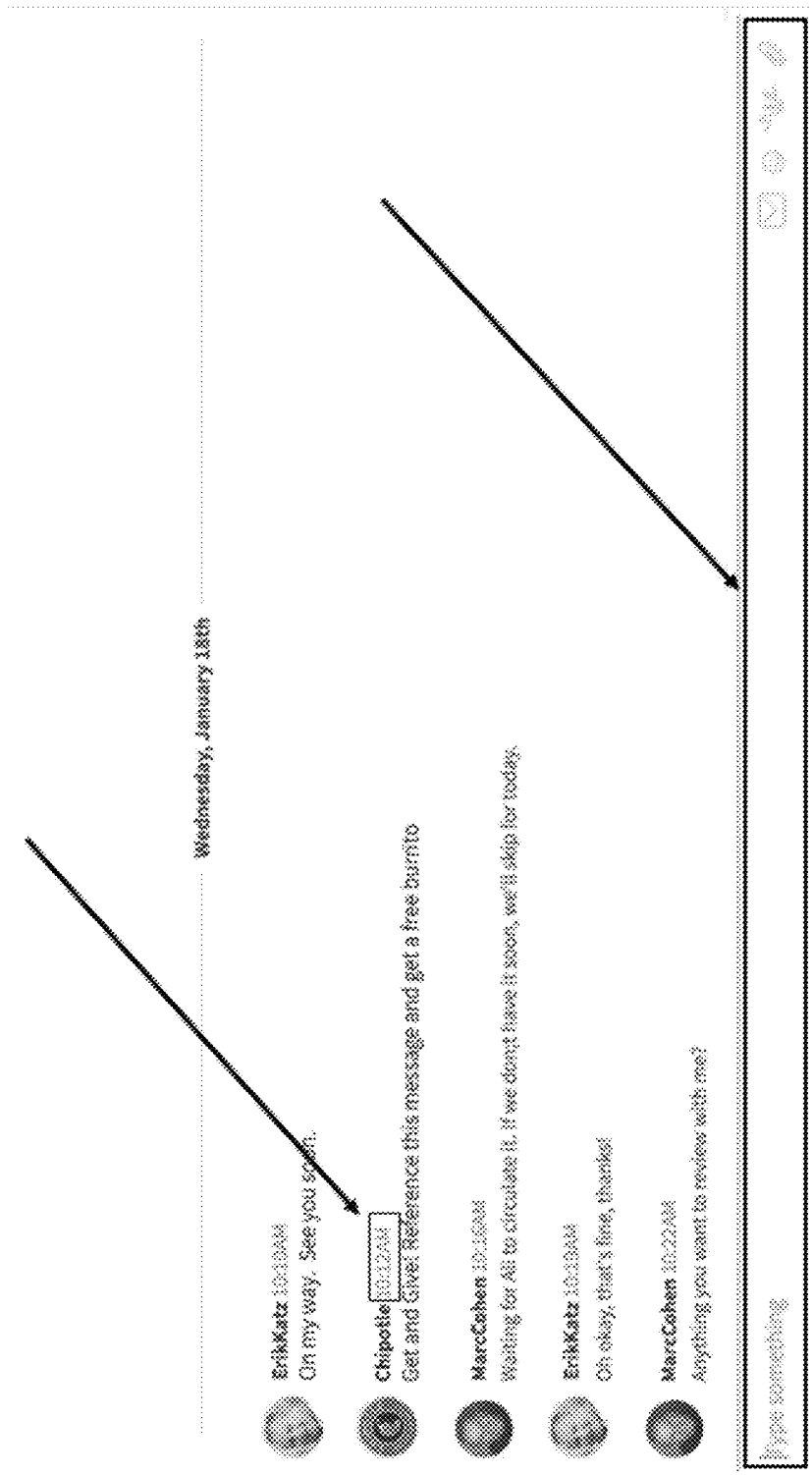
Figure 13B:
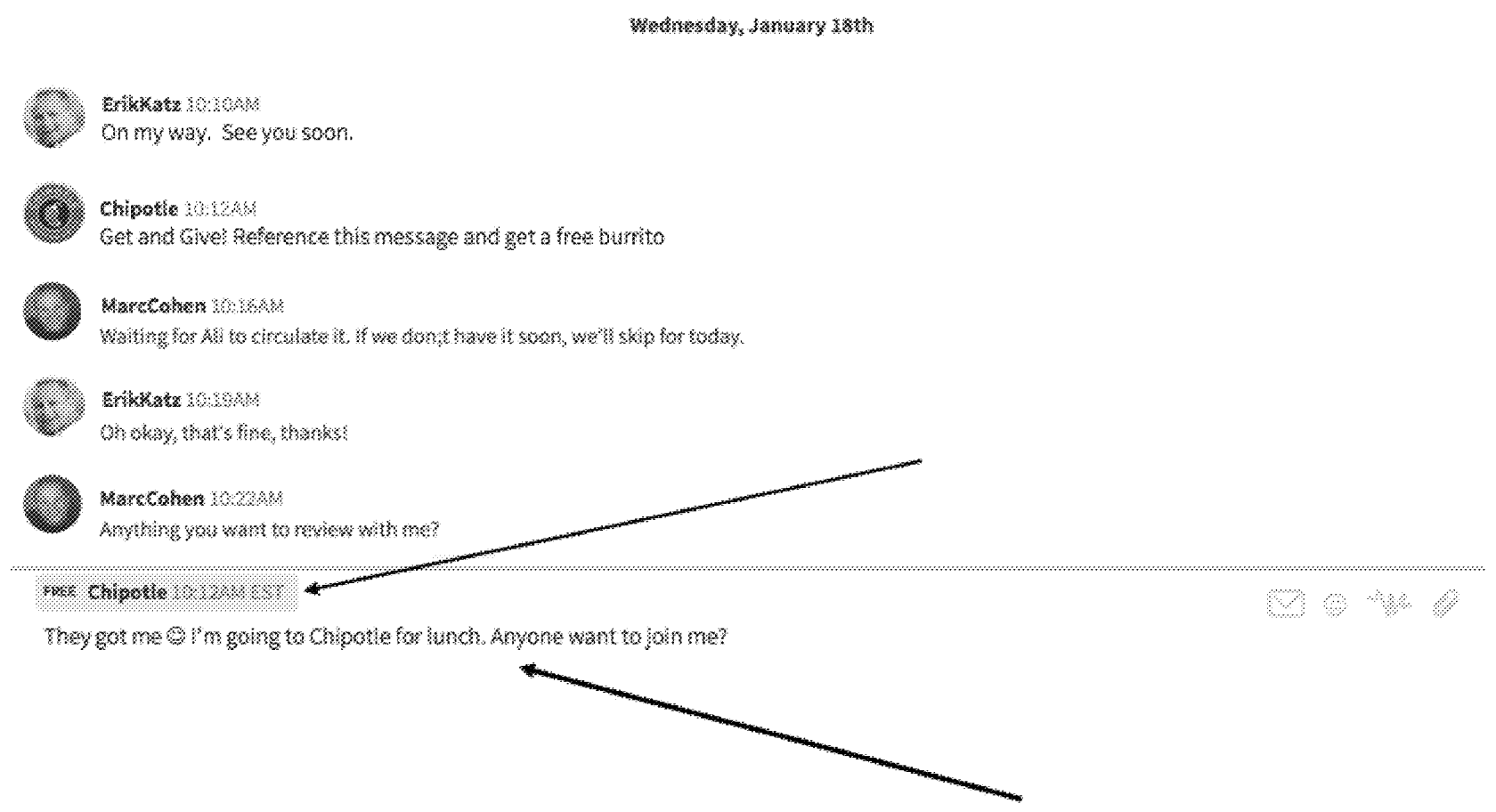
Figure 13C:
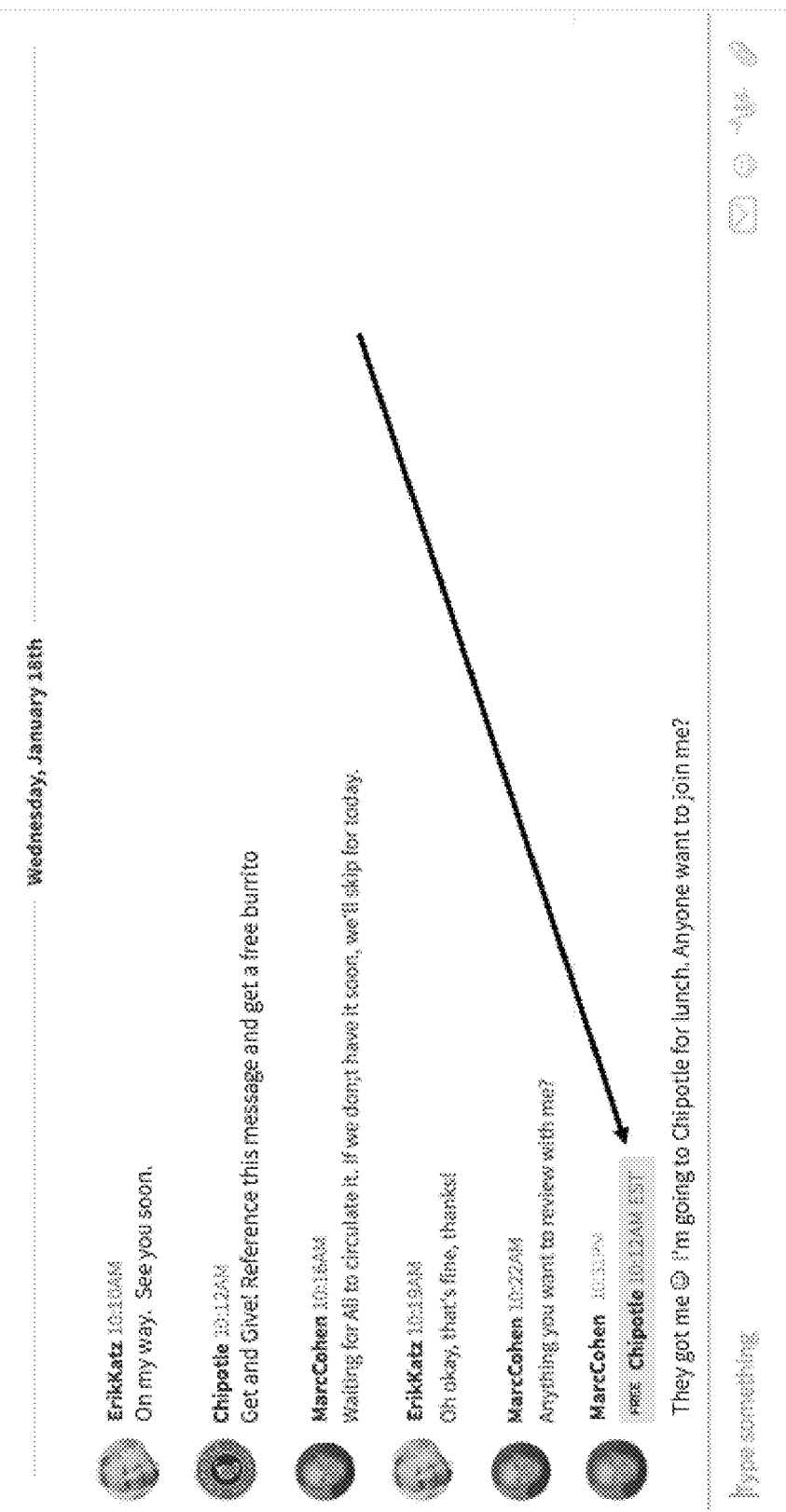
Figure 13D:
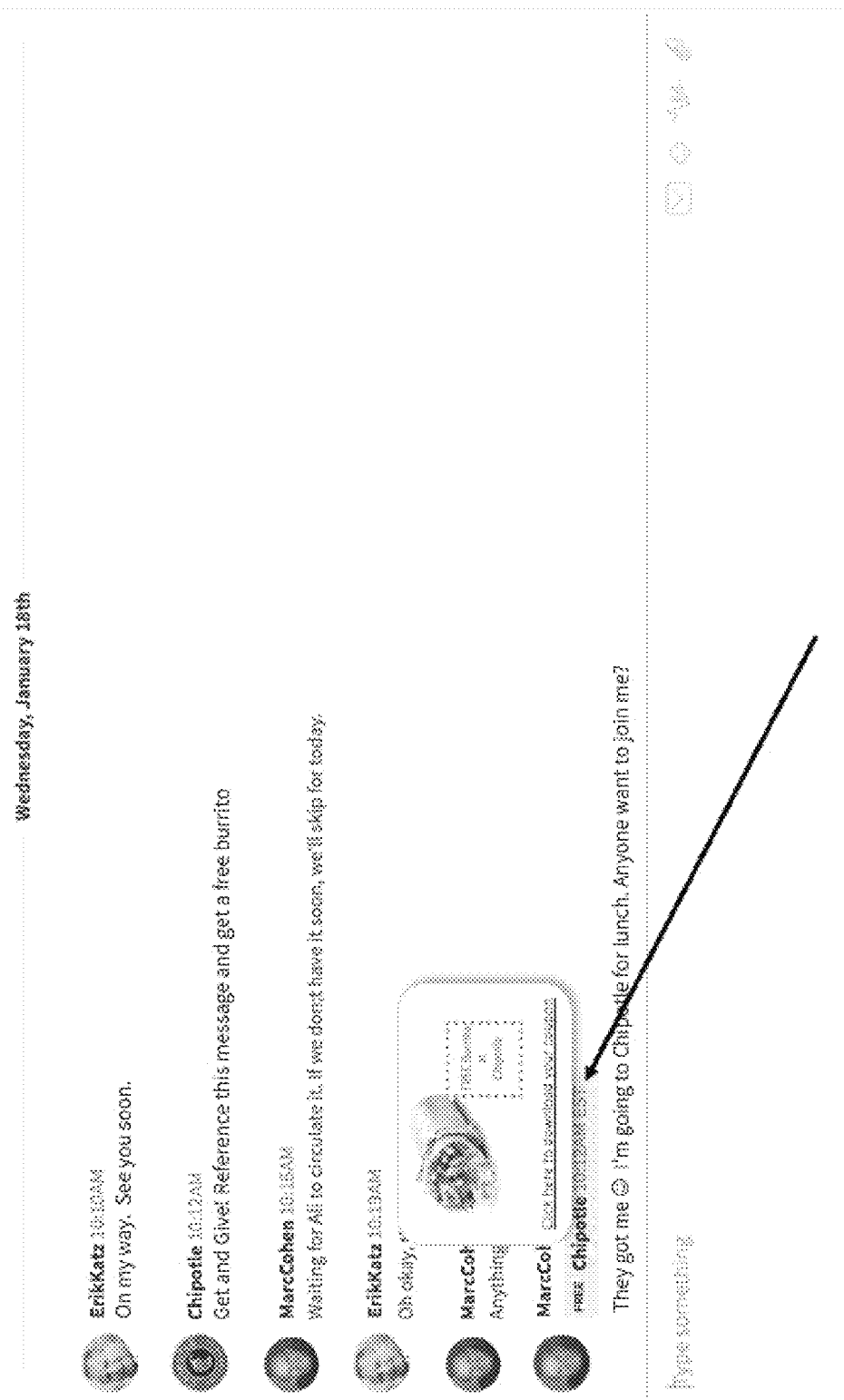

FIGS. 13A-D illustrate a further exemplary embodiment of the present invention, in which selection of a display object does not reference a previously displayed (or later displayed message) but instead references other data—in this example an advertisement. In FIG. 13A, the display object for the Chipotle message has been referenced. Thus, in FIG. 13B, a reference object corresponding to the display object referenced in FIG. 13A is inserted into the text entry box. Once transmitted, a message appears in FIG. 13C that includes a display object corresponding to the reference object inserted into the text entry box in FIG. 13B. FIG. 13D illustrates an exemplary image that appears when the display object illustrated in FIG. 13C is selected. The exemplary image may appear as a popup, but this is merely exemplary as the image may appear using other display mechanisms. Selection, as in the other embodiments can be in the form of hovering, a click (form an I/O device such as a mouse), or some other action. As shown in FIG. 13D, the exemplary image in the popup includes a link that can be selected for a further action to occur. In this example, clicking the link results in the user (i.e. the user that created the message with the display object) receiving a promotion (i.e. free food). The promotion can be sent as a data transmission in a variety of manners including text, email, a popup, etc. The text can be sent, for example, simultaneously with the display of a popup on the screen where the display object has been selected.

In the above explanation, the result of the actions described is the display of a popup that includes a link which, when clicked results in a data transmission with a discount coupon (for example). This is merely exemplary. Other actions may occur upon selection of a field in such an exemplary popup, or instead of or in addition to display of the popup. Exemplary actions include initiation of an SMS text message, saving messages to an application (such as Evernote), popping up an additional window (which may also include a link that can be selected for further action to occur), and/or other actions.

In several exemplary embodiments, a first message is displayed before a second message is formed with a reference object (that may be converted to a display object). In those embodiments, after the second message is formed, when the display object associated with the second message is selected, the information associated with the first message that is displayed is at least a portion (e.g. text) of the first message that was displayed. The examples illustrated in FIGS. 13A-D show a feature in place of, or in addition to the above feature. In the examples illustrated in FIGS. 13A-D, again a first message is displayed before a second message is formed with a reference object (that may be converted to a display object). After the second message is formed, however, when the display object associated with the second message is selected, information associated with the first message that is displayed is other than any portion of the message that was displayed (e.g. an advertisement).

In an exemplary embodiment of the present invention, the first message and the second message are part of a stream of messages. A stream of messages includes a plurality of messages sent one after another, i.e. one message appears, another message appears after the earlier message, etc. Multiple messages may exist between the first and second messages, or the first and second messages may be adjacent to each other in the stream. The stream of messages may exist, for example, in a single channel of communication (although messages across multiple channels of communication are also contemplated). In at least one exemplary embodiment, a display can be (continuously) scrolled from the earlier message to the later message.

In one or more exemplary embodiments of the present invention, it may be possible to remove a reference object; various techniques may be implemented. For example, the reference object may be removed from the text entry box in response to a user interaction with the reference object. If the user is using a touch screen display, the reference object may be removed by pressing on that area of the display. In other implementations, the reference object may be removed by the user clicking on the reference object with, e.g., a mouse. In some exemplary embodiments, the reference object may be deleted by using the text entry cursor back space over/delete the object.

In an exemplary embodiment of the present invention, when the message is sent via a network as shown in FIGS. 1 and 2, the display object is included in the newly posted message. In some implementations, the display object is visually distinguishable from text entered by the user along with the object. For example, the display object may be a different text color, font size or include animation to distinguish it from the normal text data.

After the reference object is entered into the chat message session, and the display object appears in the chat message session, the user may still be able to edit or remove the display object. To edit the display object in the chat session, the user may first select the object by, for example, clicking on the object. A window or other kinds of display may appear at the interface portal with respect to the reference object. The user may then delete the display object using any of the techniques described above. The user, in an exemplary embodiment of the present invention, may replace or add one more different display objects, by selecting a display object associated with a different previous chat message. After the user has completed their edits, the window may be closed and the interface portal will be automatically updated with the new or deleted display objects. This update is also transmitted to the other user that received the newly posted message so that their respective interface portals likewise reflect the current state of the newly posted message.

In a further exemplary embodiment, a previously (or later) sent message can be edited to include a display object that was not previously associated with the sent message.

A user may enable the reference object in several ways. For example, the user may move a mouse over a portion of the display object. As shown in FIG. 8D, a popup window (or view) may be shown that displays the data from the previous chat message that is referenced by the display object. By hovering over and/or selecting the display object the text of the referenced message is displayed [above, to the side of, below] the chat message. Optionally, the user may toggle through successive display objects when more than one is added to the chat message. In this regard, the display object can serve a dual purpose of a control which, when activated, toggles through successive previous chat messages appearing in the popup window. Thus, the display objects provide a reader with immediate and useful context relating to the message they are reading. In exemplary embodiments of the present invention, the popup window (or any view that appears responsive to selection of a display object) may include hyperlinks, attachments (e.g. documents, photos, movies), or other embedded actionable items (such as "print" or "share"). The popup window can be passive or active. Thus, for example, clicking on a hyperlink that appears in a popup window can result in viewing of the target to the hyperlink, downloading an embedded attachment, etc. As a further example, it may be possible for a user to "star" (i.e. tag) the message referenced by the popup window. As a further example, a user can "jump" to the original referenced message (and thus locate and change a display to the original placement of a message within a stream of messages).

To clarify, the display object or link object can be embedded in the "REF Pop." A REF Pop refers to a window that is displayed in response to a user hovering or clicking on a display object. In some cases, the user may click on hypertext or another object and that object will launch an action such as a jump to the original message (e.g., the message being referenced). This and other actions may be launched from the REF Pop as well as following a hypertext link or perhaps even launching a form or listening to an audio recording or viewing an image. In other words, the REF Pop may be more than a passive read only display—in some cases a user can interact with it for deeper/further functionality.

In an exemplary embodiment of the present invention, various other types of visual or audio mechanisms can be activated in response to the user enabling the reference object. For example, when the user directs a mouse to hover over the reference object, the display label associated with the object may change in text color, font size. In some implementations, an animation may be displayed at the reference object. The changes can be to the referenced object "in place" or elsewhere on the interface portal. In other implementation, if the user is using a mobile device that enables the touchscreen to distinguish between different levels of force being applied to their surfaces, the reference object may be enabled depending on the amount of force applied. For example, if the user presses on the touchscreen at the reference object, the popup window may be shown that displays the previous chat message, which provides the reader with context to the chat message that is currently being read.

In a further exemplary embodiment of the present invention, the invention may be useful across multiple channels. Assume, for example, that one conversation is occurring in one channel and another communication is occurring in another channel. Thus, a "second message" can be created in one channel based on a "first message" that appears in another channel.

In a further exemplary embodiment of the present invention, nested references may be available. For example, if a reference is made to a prior message which also contains a display object (and so on), a feature may be available to view all nested messages together. In other words, assume one display object references a message with a display object, and that display object references another message with a display object. In this exemplary embodiment, all the messages referenced by display objects (in nested formation) may be displayed together.

The above explanation has included exemplary embodiments to permit a message to reference other data. These embodiments have relied on the use of technology to achieve advantages that are not obtained by the prior art. In particular, by enabling a user to interact with a display, the user is able to select objects or areas on the screen in order to create messages that reference other data, such as other messages. By providing for the ability to select objects and/or areas on a display screen, not only can additional information (such as messages or message portions) be viewed, but other forms of data can be viewed as well. Several of these exemplary embodiments allow (for example) one message (or portion thereof) to be viewed without scrolling up or down from another message to be viewed. The ability to view a first message (or other data) while a second message is in an area of a display that was being viewed allows efficient operation of a computing device without manual searching for the first message. This improvement to the technology of computer devices conveys other benefits as well. For example, the ability to insert the reference object into the text entry box through a single click (or with fewer operations than with other methods) enables information associated with a message to be easily available (i.e. displayable) by reference to another message. Also, for example, the ability to include multiple references to other messages in a single message facilitates commenting and referencing more than one message at the same time without tedious specification and description of more than one message.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method for operating a messaging device, said method comprising the steps of:
    displaying to a first user, on a display of said device, a window displaying at least a portion of a stream comprising graphical message display objects, each graphical message display object displayed in said window occupying a respective displayed area having a boundary and one or more fixed graphical elements displayed therein, wherein said window is associated with a predefined plurality of users of a messaging system, said plurality including said first user, and wherein at least a subset of the display objects in said stream represent respective messages of a chat message session between those users;
    directly responsive to receiving, through a user interface of said device, a single click or touch screen gesture that interacts with at least one of said fixed graphical elements displayed within the boundary of a first one of said displayed graphical message display objects:
        displaying, on said display and in conjunction with display of a message creation interface including a text entry box, a reference indication indicating a reference to said first one of said displayed graphical message display objects;
        while said message creation interface is displayed, continuing to display at least a portion of said stream in said window, and enabling the device to respond to clicks or touch screen gestures that interact with at least one other of said graphical message display objects in said stream;
        in response to receiving further user input through said message creation interface during display of said reference indication:
            displaying, in said window, a new graphical message display object based on said further user input and in association with a graphical reference to a message associated with said first one of said displayed graphical message display objects; and
            transmitting, to at least one of said predefined plurality of users, a message based on said further user input, and a reference to said message associated with said first one of said displayed graphical message display objects; and
        making said device responsive to a click or touch screen gesture interacting with said graphical reference to provide a further display indicating content of said message represented by said graphical reference.

2. A method according to claim 1, said method further comprising the step of directly responsive to receiving through said user interface a further single click or touch screen gesture that interacts with another one of said fixed graphical elements displayed within the boundary of said first one of said displayed graphical message display objects, creating a further reference indication associated with said first one of said displayed graphical message display objects.

3. A method according to claim 1, said method further comprising the step of directly responsive to receiving through said user interface a further single click or touch screen gesture that interacts with at least one of said fixed graphical elements displayed within the boundary of another one of said displayed graphical message display objects, creating a further reference indication associated with said another one of said displayed graphical message display objects.

4. A method according to claim 1, wherein said reference indication displays at least a portion of the content of said first one of said displayed graphical message display objects.

5. A method according to claim 1, wherein said further display indicating said content of said message represented by said graphical reference includes displaying at least a portion of said message.

6. A method according to claim 1, wherein said reference indication and said graphical reference are the same.

7. A method according to claim 1, wherein said reference indication and said graphical reference are not the same.

8. A method according to claim 1, wherein said further display indicating said content of said message represented by said graphical reference includes display of content that is other than any portion of said message that was previously displayed.

9. A method according to claim 1, wherein said further display indicating said content of said message represented by said graphical reference includes display of content that is inferred, derived or looked up.

10. A method according to claim 1, wherein said further display indicating said content of said message represented by said graphical reference includes display of an advertisement.

11. A method according to claim 1, wherein said further display indicating said content of said message represented by said graphical reference is displayed where said content of said message is displayed in said stream.

12. A method according to claim 1, wherein said further display indicating said content of said message represented by said graphical reference is displayed where said graphical reference is displayed in said stream.

13. A method according to claim 1, said method further including the step of receiving further user input that interacts with said further display indicating said content of said message represented by said graphical reference while said further display is visible.

14. A method according to claim 1, wherein said single click or touch screen gesture is not an interaction with a menu.

15. A method according to claim 1, wherein said at least one of said fixed graphical elements is displayed in a visually distinguishable manner relative to other portions of said first one of said displayed graphical message display objects.

16. A messaging device, comprising:
    a computer readable medium having stored therein instructions for a referencing scheduler;

a processor configured to execute the referencing scheduler, the referencing scheduler operable to
  display to a first user, on a display of said device, a window displaying at least a portion of a stream comprising graphical message display objects, each graphical message display object displayed in said window occupying a respective displayed area having a boundary and one or more fixed graphical elements displayed therein, wherein said window is associated with a predefined plurality of users of a messaging system, said plurality including said first user, and wherein at least a subset of the display objects in said stream represent respective messages of a chat message session between those users;
  directly responsive to receiving, through a user interface of said device, a single click or touch screen gesture that interacts with at least one of said fixed graphical elements displayed within the boundary of a first one of said displayed graphical message display objects:
    display, on said display and in conjunction with display of a message creation interface including a text entry box, a reference indication indicating a reference to said first one of said displayed graphical message display objects;
    while said message creation interface is displayed, continuing to display at least a portion of said stream in said window, and enabling the device to respond to clicks or touch screen gestures that interact with at least one other of said graphical message display objects in said stream;
    in response to receiving further user input through said message creation interface during display of said reference indication:
      display, in said window, a new graphical message display object based on said further user input and in association with a graphical reference to a message associated with said first one of said displayed graphical message display objects; and
      transmit, to at least one of said predefined plurality of users, a message based on said further user input, and a reference to said message associated with said first one of said displayed graphical message display objects; and
    make said device responsive to a click or touch screen gesture interacting with said graphical reference to provide a further display indicating content of said message represented by said graphical reference.

17. A messaging device according to claim 16, wherein directly responsive to receiving through said user interface a further single click or touch screen gesture that interacts with another one of said fixed graphical elements displayed within the boundary of said first one of said displayed graphical message display objects, a further reference indication is created that is associated with said first one of said displayed graphical message display objects.

18. A messaging device according to claim 16, wherein directly responsive to receiving through said user interface a further single click or touch screen gesture that interacts with another one of said fixed graphical elements displayed within the boundary of another one of said displayed graphical message display objects, a further reference indication is created that is associated with said another one of said displayed graphical message display objects.

19. A messaging device according to claim 16, wherein said further display indicating said content of said message represented by said graphical reference includes displaying at least a portion of said message.

20. A messaging device according to claim 16, wherein said further display indicating said content of said message represented by said graphical reference includes display of content that is other than any portion of said message that was previously displayed.

21. A messaging device according to claim 16, wherein said further display indicating said content of said message represented by said graphical reference includes display of an advertisement.

22. A messaging device according to claim 16, wherein said messaging device is responsive to further user input that interacts with said further display indicating said content of said message represented by said graphical reference while said further display is visible.

23. A messaging device according to claim 16, wherein said at least one of said fixed graphical elements is displayed in a visually distinguishable manner relative to other portions of said first one of said displayed graphical message display objects.

24. A non-transitory computer readable medium having stored thereon instructions for operating a messaging device, the instructions, when executed by a processor, cause the processor to implement the steps of:
  displaying to a first user, on a display of said device, a window displaying at least a portion of a stream comprising graphical message display objects, each graphical message display object displayed in said window occupying a respective displayed area having a boundary and one or more fixed graphical elements displayed therein, wherein said window is associated with a predefined plurality of users of a messaging system, said plurality including said first user, and wherein at least a subset of the display objects in said stream represent respective messages of a chat message session between those users;
  directly responsive to receiving, through a user interface of said device, a single click or touch screen gesture that interacts with at least one of said fixed graphical elements displayed within the boundary of a first one of said displayed graphical message display objects:
    displaying, on said display and in conjunction with display of a message creation interface including a text entry box, a reference indication indicating a reference to said first one of said displayed graphical message display objects;
    while said message creation interface is displayed, continuing to display at least a portion of said stream in said window, and enabling the device to respond to clicks or touch screen gestures that interact with at least one other of said graphical message display objects in said stream;
    in response to receiving further user input through said message creation interface during display of said reference indication:
      displaying, in said window, a new graphical message display object based on said further user input and in association with a graphical reference to a message associated with said first one of said displayed graphical message display objects; and
      transmitting, to at least one of said predefined plurality of users, a message based on said further user input, and a reference to said message associated with said first one of said displayed graphical message display objects; and making said device responsive to a click or touch screen gesture interacting with said graphical reference to provide a further display indicating content of said message represented by said graphical reference.

25. A non-transitory computer readable medium according to claim 24, wherein directly responsive to receiving through said user interface a further single click or touch screen gesture that interacts with another one of said fixed graphical elements displayed within the boundary of said first one of said displayed graphical message display objects, a further reference indication is created that is associated with said first one of said displayed graphical message display objects.

26. A non-transitory computer readable medium according to claim 24, wherein directly responsive to receiving through said user interface a further single click or touch screen gesture that interacts with another one of said fixed graphical elements displayed within the boundary of another one of said displayed graphical message display objects, a further reference indication is created that is associated with said another one of said displayed graphical message display objects.

27. A non-transitory computer readable medium according to claim 24, wherein said further display indicating said content of said message represented by said graphical reference includes displaying at least a portion of said message.

28. A non-transitory computer readable medium according to claim 24, wherein said further display indicating said content of said message represented by said graphical reference includes display of content that is other than any portion of said message that was previously displayed.

29. A non-transitory computer readable medium according to claim 24, wherein said further display indicating said content of said message represented by said graphical reference includes display of an advertisement.

30. A non-transitory computer readable medium according to claim 24, wherein said instructions make said messaging device responsive to further user input that interacts with said further display indicating said content of said message represented by said graphical reference while said further display is visible.

* * * * *

(12) INTER PARTES REVIEW CERTIFICATE (3118th)

United States Patent
Cohen et al.

(10) Number: US 10,728,192 K1
(45) Certificate Issued: May 4, 2023

(54) APPARATUS AND METHOD FOR MESSAGE REFERENCE MANAGEMENT

(71) Applicants: Marc A. Cohen; Erik S. Katz

(72) Inventors: Marc A. Cohen; Erik S. Katz

(73) Assignee: WRINKL, INC.

Trial Number:

IPR2021-00883 filed May 7, 2021

Inter Partes Review Certificate for:

Patent No.: 10,728,192
Issued: Jul. 28, 2020
Appl. No.: 16/712,952
Filed: Dec. 12, 2019

The results of IPR2021-00883 are reflected in this inter partes review certificate under 35 U.S.C. 318(b).

INTER PARTES REVIEW CERTIFICATE
U.S. Patent 10,728,192 K1
Trial No. IPR2021-00883
Certificate Issued May 4, 2023

AS A RESULT OF THE INTER PARTES REVIEW PROCEEDING, IT HAS BEEN DETERMINED THAT:

Claims 1-9, 11-20, 22-28 and 30 are cancelled.

\* \* \* \* \*